United States Patent
Yagyu

(10) Patent No.: US 12,522,675 B2
(45) Date of Patent: Jan. 13, 2026

(54) METHOD FOR PRODUCING HOLLOW PARTICLES AND HOLLOW PARTICLES

(71) Applicant: ZEON CORPORATION, Tokyo (JP)

(72) Inventor: Sakyo Yagyu, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 455 days.

(21) Appl. No.: 18/031,802

(22) PCT Filed: Oct. 29, 2021

(86) PCT No.: PCT/JP2021/040023
§ 371 (c)(1),
(2) Date: Apr. 13, 2023

(87) PCT Pub. No.: WO2022/092265
PCT Pub. Date: May 5, 2022

(65) Prior Publication Data
US 2023/0383020 A1    Nov. 30, 2023

(30) Foreign Application Priority Data

Oct. 30, 2020    (JP) .................................. 2020-182282

(51) Int. Cl.
| | | |
|---|---|---|
| C08F 2/18 | (2006.01) | |
| B01J 13/16 | (2006.01) | |
| C08F 2/44 | (2006.01) | |
| C08F 20/14 | (2006.01) | |

(52) U.S. Cl.
CPC ............... *C08F 2/18* (2013.01); *B01J 13/16* (2013.01); *C08F 2/44* (2013.01); *C08F 20/14* (2013.01)

(58) Field of Classification Search
CPC ..... C08F 2/18; C08F 2/44; C08F 20/14; B01J 13/16
USPC .......................................................... 524/556
See application file for complete search history.

(56) References Cited

U.S. PATENT DOCUMENTS

| | | |
|---|---|---|
| 2021/0087349 A1 | 3/2021 | Iga et al. |
| 2022/0153881 A1 | 5/2022 | Iga et al. |
| 2022/0251247 A1 | 8/2022 | Hirata |
| 2023/0381731 A1 | 11/2023 | Watanabe |

FOREIGN PATENT DOCUMENTS

| | | | |
|---|---|---|---|
| EP | 4071187 A1 | 10/2022 | |
| EP | 4223801 A1 | 8/2023 | |
| JP | 6513273 B1 | 5/2019 | |
| JP | 2020-033503 A | 3/2020 | |
| WO | 2019/026899 A1 | 2/2019 | |
| WO | WO-2020162300 A1 * | 8/2020 | ........ C08F 220/1804 |
| WO | 2020/261926 A1 | 12/2020 | |
| WO | 2022/071276 A1 | 4/2022 | |

OTHER PUBLICATIONS

Extended (supplementary) European Search Report dated Feb. 26, 2025, issued in counterpart EP Application No. 21886382.7.(14 pages).
English Translation of International Search Repot dated Jan. 11, 2022, issued in counterpart Application No. PCT/JP2021/040023. (2 pages).
Notification of Transmittal of Translation of the International Preliminary Report on Patentability (Form PCT/IB/338) issued in counterpart International Application No. PCT/JP2021/040023 mailed May 11, 2023 with Forms PCT/IB/373 and PCT/ISA/237. (7 pages).
Office Action dated Nov. 19, 2024, issued in counterpart EP Application No. 21886382.7. (15 pages).

* cited by examiner

*Primary Examiner* — Deve V Hall
(74) *Attorney, Agent, or Firm* — WHDA, LLP

(57) ABSTRACT

A method for producing hollow particles which comprise a shell and a hollow portion surrounded by the shell and which have a void ratio of 50% or more, the method comprising: preparing a mixture liquid containing a polymerizable monomer, a hydrophobic solvent, a polymerization initiator, a dispersion stabilizer and an aqueous medium, suspending the mixture liquid to prepare a suspension in which droplets or a monomer composition containing the polymerizable monomer, the hydrophobic solvent and the polymerization initiator are dispersed in the aqueous medium, and subjecting the suspension to a polymerization reaction to prepare a precursor composition containing precursor particles which have a hollow portion surrounded by a shell containing a resin and which include the hydrophobic solvent in the hollow portion, wherein the polymerizable monomer contains a crosslinkable monomer, and wherein an HOP distance between the crosslinkable monomer and the hydrophobic solvent is 5.80 to 6.50.

9 Claims, 3 Drawing Sheets

METHOD FOR PRODUCING HOLLOW PARTICLES AND HOLLOW PARTICLES

TECHNICAL FIELD

The present disclosure relates to a method for producing hollow particles, and hollow particles obtained by the production method.

BACKGROUND ART

Hollow particles (hollow resin particles) are particles each of which has a hollow in its interior, and they can scatter light well and can reduce light transmissivity as compared to solid particles in which their interiors are practically filled with resin; hence, hollow particles are widely used in the applications of, for example, aqueous coating materials and paper coating compositions, as organic pigments and masking agents excellent in optical properties such as opacity and whiteness. Also, in recent years, hollow particles are used as weight reducing materials, heat insulation materials or the like for resins and coating materials, which are used in various kinds of fields such as the automotive field, the electronic field, the electric field and the architecture field.

For example, Patent Literature 1 discloses a method for producing hollow resin particles, the method including the steps of: obtaining, by mixing water, a crosslinkable monomer and a hydrophobic solvent, crosslinkable monomer droplets in which the hydrophobic solvent is included by the crosslinkable monomer; obtaining resin particles containing a polymer of the crosslinkable monomer including the hydrophobic solvent, by polymerizing the crosslinkable monomer of the crosslinkable monomer droplets; and obtaining, by removing the hydrophobic solvent from the resin particles, hollow resin particles which are hollow inside and which contain the polymer of the crosslinkable monomer. The crosslinkable monomer contains one or more polyfunctional monomers having three or more polymerizable double bonds. Patent Literature 1 also discloses that the one or more polyfunctional monomers are copolymerized with a monofunctional monomer to increase the strength of the hollow resin particles. Patent Literature 1 also discloses that toluene and hexane are preferred as the hydrophobic solvent.

CITATION LIST

Patent Literature

Patent Literature 1: Japanese Patent Application Laid-Open (JP-A) No. 2020-033503

SUMMARY OF INVENTION

Technical Problem

The shell thickness of hollow particles having the same void ratio increases as the particle diameter increases. The pressure resistance of the hollow particles increases as the shell thickness increases. Accordingly, the hollow particles having a large particle diameter are advantageous in that they have excellent pressure resistance while having a high void ratio.

However, when hollow particles having a volume average particle diameter of 10 μm or more axe produced by a conventional production method, porous particles are produced, or when hollow particles having hollow port are obtained, the shell thickness non-uniformity is large. In Comparative Example 6 described later, combination of the same polymerizable monomer and hydrophobic solvent as those of Example 1 in Patent Literature was used. As a result, a hollow portion was not formed in the interior of the particles thus produced, and the produced particles were porous particles.

The properties of the hollow particles having large shell thickness non-uniformity, tend to be non-uniform. Especially, the pressure resistance of the hollow particles tends to be non-uniform. Accordingly, is preferable that the shell thickness non-uniformity of hollow particles is small.

An object of the present disclosure is to provide a method for producing hollow particles, which can suppress shell thickness non uniformity even in the case of producing hollow particles having a volume average particle diameter of 10 μm or more. Another object of the present disclosure is to provide hollow particles which are obtained by the production method and in which shell thickness non-uniformity is suppressed.

Solution to Problem

The inventor of the present disclosure found that in the case of producing hollow particles having a volume average particle diameter of 10 μm or more by the suspension polymerization method, controlling an HSP distance between a crosslinkable monomer, which is used as a polymerizable monomer, and a hydrophobic solvent, which is included in the hollow particles in the production process, within a specific range is effective in suppressing shell thickness non-uniformity.

The present disclosure provides a method for producing hollow particles which comprise a shell containing a resin and a hollow portion surrounded by the shell and which have a void ratio of 50% or more, the method comprising:
preparing a mixture liquid containing a polymerizable monomer, a hydrophobic solvent, a polymerization initiator, a dispersion stabilizer and an aqueous medium,
suspending the mixture liquid to prepare a suspension in which droplets of a monomer composition containing the polymerizable monomer, the hydrophobic solvent and the polymerization initiator are dispersed in the aqueous medium, and
subjecting the suspension to a polymerization reaction to prepare a precursor composition containing precursor particles which have a hollow portion surrounded by a shell containing a resin and which include the hydrophobic solvent in the hollow portion,
wherein the polymerizable monomer contains a crosslinkable monomer, and
wherein an HSP distance between the crosslinkable monomer and the hydrophobic solvent is 5.80 or more and 6.50 or less.

In the method for producing the hollow particles according to the present disclosure, the hydrophobic solvent preferably contains two or more kinds of hydrophobic solvents.

In the method for producing the hollow particles according to the present disclosure, the crosslinkable monomer preferably contains a bifunctional crosslinkable monomer having two polymerizable functional groups, and a content of the bifunctional crosslinkable monomer in 100 parts by mass of the polymerizable monomer, is preferably 70 parts by mass or more and 100 parts by mass or less.

In the method for producing the hollow particles according to the present disclosure, the crosslinkable monomer preferably contains a bifunctional crosslinkable monomer having two polymerizable functional groups and a trifunctional or higher-functional crosslinkable monomer having three or more polymerizable functional groups.

In the method for producing the hollow particles according to the present disclosure, the mixture liquid preferably contains at least one selected from the group consisting of rosin acids, higher fatty acids and metal salts thereof.

In the method for producing the hollow particles according to the present disclosure, dispersion stabilizer is preferably an inorganic dispersion stabilizer, and the inorganic dispersion stabilizer is preferably a sparingly water-soluble metal salt.

In the method for producing the hollow particles according to the ore sent disclosure, a volume average particle diameter of the hollow particles is preferably 10 μm or more and 50 μm or less.

The present disclosure provides hollow particles which comprise a shell containing a resin and a hollow portion surrounded by the shell and which have a void ratio of 50% or more,
wherein a volume average particle diameter is 10 μm or more and 50 μm or less;
wherein a ratio of an actually measured shell thickness to a theoretical shell thickness (actually measured shell thickness/theoretical shell thickness) is 0.80 or more and 1.00 or less; and
wherein the theoretical shell thickness is a value obtained by calculating an inner diameter r of the hollow particles by the following formula (1) using the volume average particle diameter R and void ratio of the hollow particles, and calculating the theoretical shell thickness by the following formula (2) using the inner diameter r and the volume average particle diameter R:

$$4/3\pi \times (R/2)^3 \times (\text{Void ratio}/100) = 4/3\pi \times (r/2)^3 \quad \text{Formula (1)}$$

$$\text{Theoretical shell thickness} = (R-r)/2 \quad \text{Formula (2)}.$$

Advantageous Effects of Invention

According to the above-described production method of the present disclosure, even in the case of producing hollow particles having a volume average particle diameter of 10 μm or more, hollow particles in which shell thickness non-uniformity is suppressed, can be obtained.

BRIEF DESCRIPTION OF DRAWINGS

In the accompanying drawings.

DESCRIPTION OF EMBODIMENT

Figure 1:
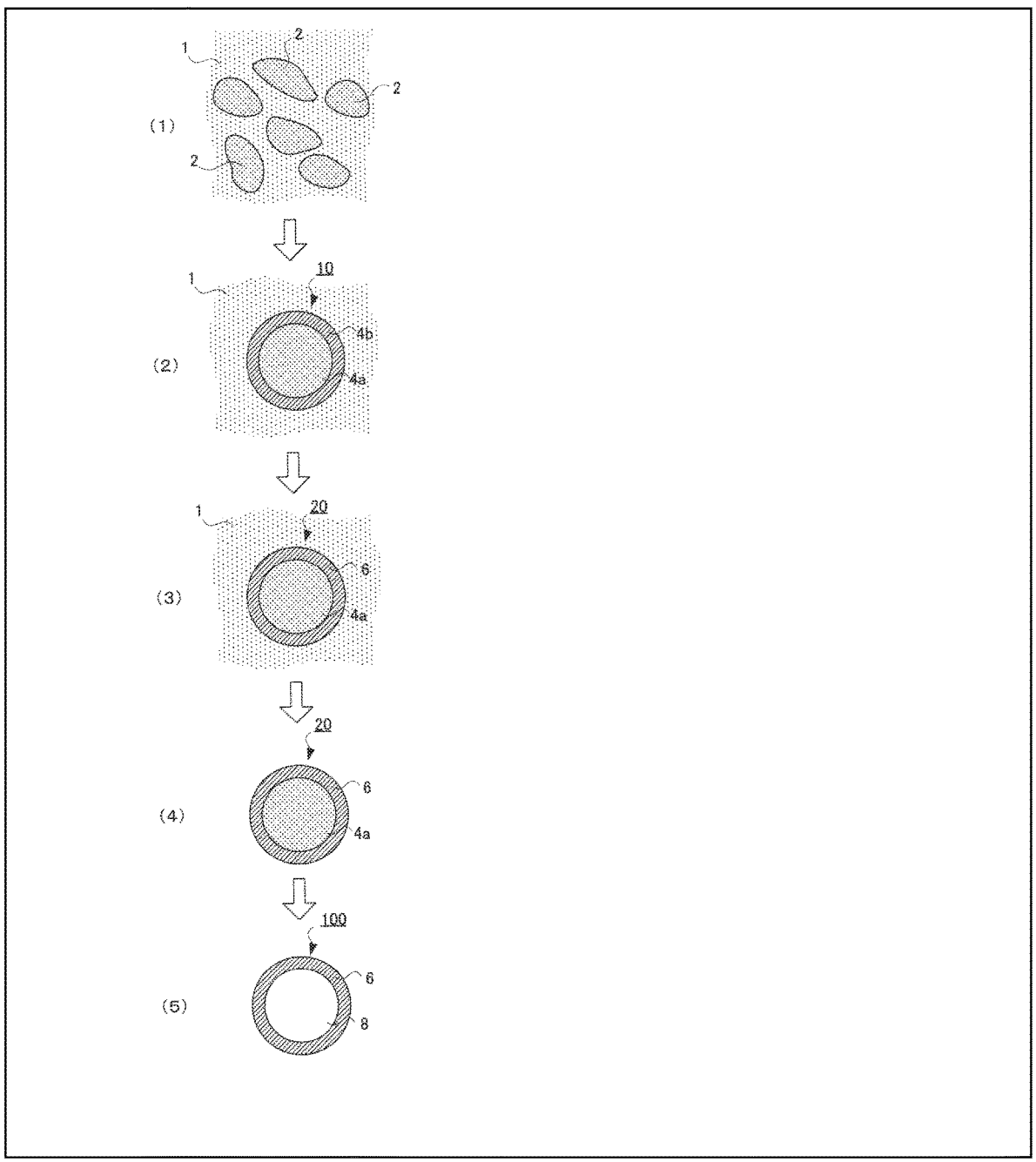
FIG. 1 is a diagram illustrating an example of the production method of the present disclosure.

In the present disclosure, "A to B" in a numerical range is used to describe a range in which the numerical value A is included as the lower limit value and the numerical value B is included as the upper limit value.

Also in the present disclosure, (meth)acrylate means each of acrylate and methacrylate; (meth)acryl means each of acryl and methacryl; and (meth)acryoyl means each of acryloyl and methacryloyl.

Also in the present disclosure, the term "polymerizable monomer" means a compound having an addition-polymerizable functional group (in the present disclosure, it may be simply referred to as a "polymerizable functional group"). Also in the present disclosure, as the polymerizable monomer, a compound having an ethylenically unsaturated bond as the addition-polymerizable functional group, is generally used.

There are two kinds of polymerizable monomers: non-crosslinkable monomer and a crosslinkable monomer. The non-crosslinkable monomer is a polymerizable monomer which has only polymerizable functional group, and the crosslinkable monomer is a polymerizable monomer which has two or more polymerizable functional groups and which forms crosslinking in resin by a polymerization reaction.

The hollow particles obtained by the production method of the present disclosure are particles which comprise a resin-containing shell (outer shell) and a hollow portion surrounded by the shell.

In the present disclosure, the term "hollow portion" means a hollow space clearly distinguished from the shell of hollow particles formed from a resin material. The shell of the hollow particles may have a porous structure. In this case, the hollow portion has a size that is clearly distinguishable from many minute spaces uniformly dispersed in the porous structure. According to the production method of the present disclosure, the shell of the hollow particles can be solid.

The hollow portion of the hollow particles can be determined by, for example, SEM observation of a cross section of the particles or TEM observation of the particles as they are.

The hollow portion of the hollow particles may be filled with gas such as air, may be in a vacuum or reduced pressure state, or may contain a solvent.

Hereinafter, the method for producing the hollow particles according to the present disclosure and the hollow particles of the present disclosure obtained by the production method of the present disclosure, will be described in detail.

1. Method for Producing Hollow Particles

The method for producing the hollow particles according to the present disclosure, is a method for producing hollow particles which comprise a shell containing a resin and a hollow portion surrounded by the shell and which have a void ratio of 50% or more,
the method comprising:
preparing a mixture liquid containing a polymerizable monomer, a hydrophobic solvent, a polymerization initiator, dispersion stabilizer and an aqueous medium,
suspending the mixture liquid to prepare a suspension in which droplets of a monomer composition containing the polymerizable monomer, the hydrophobic solvent and the polymerization initiator are dispersed in the aqueous medium, and
subjecting the suspension to a polymerization reaction to prepare a precursor composition containing precursor particles which have a hollow portion surrounded by a shell containing a resin and which include the hydrophobic solvent in the hollow portion,
wherein the polymerizable monomer contains a crosslinkable monomer, and wherein the HSP distance between the crosslinkable monomer and the hydrophobic solvent is 5.80 or more and 6.50 or less.

The method for producing the hollow particles according to the present disclosure follows the following basic technique: by carrying out the suspension treatment of the mixture liquid containing the polymerizable monomer, the hydrophobic solvent, the polymerization initiator, the dispersion stabilizer and the aqueous medium, phase separation occurs between the polymerizable monomer and the hydrophobic solvent. Accordingly, the suspension in which droplets are dispersed in the aqueous medium, the droplets having a distribution structure such that the polymerizable monomer is distributed on the surface side and the hydrophobic solvent is distributed in the center, is prepared. By subjecting the suspension to a polymerization reaction, the surface of the droplets is cured to form the hollow particles having the hollow portion filled with the hydrophobic solvent.

The inventor found the following: in the case of producing hollow particles having a volume average particle diameter of 10 µm or more by a conventional method in accordance with the above-mentioned basic technique, the produced particles are porous particles in which the hollow portion is not formed, or even when the hollow portion is formed, the non-uniformity of the thickness of the shell large, and fine resin particles having a very small particle diameter compared to the hollow particles are produced in the hollow portion.

In the basic technique, by subjecting the suspension to a polymerization reaction, the polymerization reaction of the polymerizable monomer in the droplets progresses, and the shell is formed by the deposition of the polymer thus produced. By using the polymerizable monomer containing the crosslinkable monomer, the crosslinking density of the formed shell is increased. Accordingly, the formed shell obtains excellent strength. Meanwhile, since the polymer of the polymerizable monomer containing the crosslinkable monomer has high crosslinking density, the deposition speed after the initiation of the polymerization reaction is likely to be fast. Accordingly, it is presumed that when the polymerizable monomer containing the crosslinkable monomer is used in the production of the hollow particles having a volume average particle diameter of 10 µm or more, the polymer non-uniformly deposits on the shell surface and results in large shell thickness non-uniformity; moreover, since the polymer is deposited in the form of fine particles in the hollow portion, fine resin particles having a very small particle diameter compared to the hollow particles, are produced in the hollow portion. It is presumed that when a hydrophobic solvent having better compatibility with the polymer is used to slow down the polymer deposition, sufficient phase separation does not occur between the polymerizable monomer and the hydrophobic solvent in the droplets of the monomer composition; therefore, porous particles are produced.

In the production method of the present disclosure, the crosslinkable monomer and the hydrophobic solvent are selected and used so that the HSP distance between the crosslinkable monomer in the polymerizable monomer and the hydrophobic solvent is 5.80 or more and 6.50 or less. Accordingly, even in the case of producing the hollow particles having a volume average particle diameter of 10 µm or more, hollow particles having the following properties are obtained; the hollow portion is clearly distinguished from the shell; the shell thickness non uniformity is suppressed; and the production of the fine resin particles in the hollow is suppressed. It is presumed that in the production method of the present disclosure, since the compatibility between the polymerizable monomer and the hydrophobic solvent is suitable for producing the hollow particles having a volume average particle diameter of 10 µm or more, sufficient phase separation occurs between the polymerizable monomer and the hydrophobic solvent in the droplets of the monomer composition; moreover, when the suspension is subjected to a polymerization reaction, the polymer deposits at an appropriate speed that can impart a uniform thickness to the shell, and the deposition of the polymer in the hollow portion is suppressed.

The HSP distance is an index representing solubility between substances by using Hansen solubility parameters (HSP). As the HSP distance comes close to 0, the compatibility between substances is determined to be high. HSP represents the vector of a three-dimensional space (Hansen space) using the following parameters as the coordinate axes: dispersion term (dD), polarity term (dP) and hydrogen bonding term (dH). The three parameters dD, dP and dH represent values specific to substances. The software developed by Hansen et al. (software name: Hansen Solubility Parameter in Practice (HSPiP)) includes the databases on the dD, dP and dH of various substances. By using HSPiP, HSP can be calculated based on the chemical structures of substances.

To obtain the HSP of a mixture of several substances, based on the dD, dP and dH values of the substances contained in the mixture and on the ratio of the substances, the weighted averages thereof are calculated to obtain the dispersion term (dD), polarity term (dP) and hydrogen bonding term (dH) of the mixture, and the HSP of the mixture are obtained.

The HSP distance is a vector distance given by the HSP of two substances, and it is calculated by the following formula (A) using the values of the three parameters of the first substance (dispersion term $dD_1$, polarity term $dP_1$ and hydrogen bonding term $dH_1$) and the values of the three parameters of the second substance (dispersion term $dD_2$, polarity term $dP_2$ and hydrogen bonding term $dH_2$).

HSP distance=$\{4(dD_1-dD_2)^2+(dP_1-dP_2)^2+(dH_1-dH_2)^2\}^{0.5}$  Formula (A)

The distance between the origin of the Hansen space and the HSP is called "total HSP" and calculated by the following formula (B) where dD is dispersion term, dP is polarity term, and dH is hydrogen bonding term:

Total HSP=$(dD^2+dP^2+dH^2)^{0.5}$  Formula (B).

In the present disclosure, the HSP distance and the total HSP are values calculated by HSPiP (version 5.3.03). In the HSPiP, each of the dD, dP and dH values is expressed as significant digits with one decimal place, and each of the HSP distance and total HSP values is expressed as significant digits with two decimal places.

In the production method of the present disclosure, the crosslinkable monomer and the hydrophobic solvent are selected so that the HSP distance between the crosslinkable monomer and the hydrophobic solvent is 5.80 or more and 6.50 or less, preferably 5.85 or more and 6.40 or less, and more preferably 5.90 or more and 6.30 or less.

The HSP distance between the crosslinkable monomer and the hydrophobic solvent can be controlled within the above range, by selecting the crosslinkable monomer and the hydrophobic solvent from preferred crosslinkable monomers and hydrophobic solvents exemplified below.

According to the present disclosure, the method for producing the hollow particles includes the steps of preparing the mixture liquid, preparing the suspension, and subjecting the suspension to the polymerization reaction. The method may further include other steps. As far as technically possible, two or more of the above steps and other additional steps may be simultaneously carried out as one step, or their order may be changed and then they may be carried out in that order. For example, the preparation and suspension of the mixture liquid may be simultaneously carried out in one step (e.g., the mixture liquid may be suspended while adding the materials for the mixture liquid).

A preferred embodiment of the method for producing the hollow particles according to the present disclosure, may be a production method including the following steps.

(1) Mixture Liquid Preparation Step

The mixture liquid preparation step includes preparing the mixture liquid containing the polymerizable monomer, the hydrophobic solvent, the polymerization initiator, the dispersion stabilizer and the aqueous medium.

(2) Suspension Step

The suspension step includes suspending the mixture liquid to prepare the suspension in which the droplets of the monomer composition containing the polymerizable monomer, the hydrophobic solvent and the polymerization initiator are dispersed in the aqueous medium.

(3) Polymerization Step

The polymerization step includes subjecting the suspension to a polymerization reaction to prepare the precursor composition containing the precursor particles which have the hollow portion surrounded by the shell containing the resin and which include the hydrophobic solvent in the hollow portion.

(4) Solid-Liquid Separation Step

The solid-liquid separation step includes performing solid-liquid separation of the precursor composition to obtain the precursor particles including the hydrophobic solvent in the hollow portion.

(5) Solvent Removal Step

The solvent removal step includes removing the hydrophobic solvent from the precursor particles obtained by the solid-liquid separation step to obtain the hollow particles.

In the present disclosure, the hollow particles having the hollow portion filled with the hydrophobic solvent, may be considered as the intermediate of the hollow particles in which the hollow portion filled with gas, and they may be referred to as the "precursor particles". Also in the present disclosure, the "precursor composition" means a composition containing the precursor particles.

FIG. 1 is a schematic diagram showing an example of the production method of the present disclosure. The diagrams to (5) in FIG. 1 correspond to the steps (1) to (5) described above, respectively. White arrows between the diagrams indicate the order of the steps. FIG. 1 is merely a schematic diagram for description, and the production method of the present disclosure is not limited to the method shown in FIG. 1. Further, the structures, dimensions and shapes of materials used for the production method of the present disclosure are not limited to the structures, dimensions and shapes of various materials shown in these diagrams.

The diagram (1) of FIG. 1 is a schematic cross-sectional view showing an embodiment of the mixture liquid in the mixture liquid preparation step. As shown in the diagram, the mixture liquid contains an aqueous medium 1 and a low polarity material 2 dispersed in the aqueous medium 1. Here, the low polarity material 2 means a material that has low polarity and is less likely to mix with the aqueous medium 1. In the present disclosure, the low polarity material 2 contains the polymerizable monomer, the hydrophobic solvent and the polymerization initiator.

The diagram (2) of FIG. 1 is a schematic cross-sectional view showing an embodiment of the suspension in the suspension step. The suspension contains the aqueous medium and a droplet 10 of the monomer composition dispersed in the aqueous medium 1. The droplet 10 of the monomer composition contains the polymerizable monomer, the hydrophobic solvent and the polymerization initiator, and their distribution in the droplet is not uniform. The droplet 10 of the monomer composition has the following structure: phase separation occurs between a hydrophobic solvent 4a and a material 4b containing the polymerizable monomer and not containing the hydrophobic solvent; the hydrophobic solvent 4a is distributed in the center; the material 4b not containing the hydrophobic solvent is distributed on the surface side; and the dispersion stabilizer (not shown) is on the surface.

The diagram (3) of FIG. 1 is a schematic cross-sectional showing an embodiment of the precursor composition containing the precursor particles which have the hollow portion surrounded by the shell containing the resin and which include the hydrophobic solvent in the hollow portion. The precursor composition contains the aqueous medium 1 and the precursor particle (a precursor particle 20) which includes the hydrophobic solvent 4a in the hollow potion it shell 6 forming the outer surface of the precursor particle 20 formed by polymerization of the polymerizable monomer in the droplet 10 of the monomer composition, and the shell 6 contains the polymer of the polymerizable monomer as the resin.

The diagram (4) of FIG. 1 is a schematic cross-sectional view showing an embodiment of the precursor particle after the solid-liquid separation step. The diagram (4) of FIG. 1 shows a state where the aqueous medium 1 has been removed from the state shown in the diagram (3) of FIG. 1.

The diagram (5) of FIG. 1 is a schematic cross-sectional view showing an embodiment of the hollow particle after the solvent removal step. The diagram (5) of FIG. 1 shows a state where the hydrophobic solvent 4a has been removed from the state shown in the diagram (4) of FIG. 1. By the removal of the hydrophobic solvent from the precursor particle, a hollow particle 100 having a gas-filled hollow portion 8 in the interior of the shell 6, is obtained.

Hereinbelow, the five steps described above and other steps are described in order.

(1) Mixture Liquid Preparation Step

The mixture liquid preparation step includes preparing the mixture liquid containing the polymerizable monomer, the hydrophobic solvent, the polymerization initiator, the dispersion stabilizer and the aqueous medium. The mixture liquid may further contain other materials to the extent that does not impair the effects of the present disclosure.

The materials for the mixture liquid will be described in the order of (A) the polymerizable monomer, (B) the hydrophobic solvent, (C) the polymerization initiator, (D) the dispersion stabilizer, (E) the aqueous medium and (F) other materials.

(A) Polymerizable Monomer

In the production method of the present disclosure, the polymerizable monomer contains at least the crosslinkable monomer. It may further contain the non-crosslinkable monomer to the extent that does not impair the effects of the present disclosure.

From the point of view that the polymerization reaction is easily stabilized and hollow particles with high heat resistance are obtained, a (meth)acrylic polymerizable monomer containing a (meth)acryloyl group as a polymerizable functional group, is preferably used as the polymerizable monomer.

[Crosslinkable Monomer]

Since the crosslinkable monomer has a plurality of polymerizable functional groups, monomers can be linked together, and the crosslinking density of the shell can be increased.

As the crosslinkable monomer, examples include, but are not limited to, a bifunctional crosslinkable monomer having two polymerizable functional groups, such as divinylbenzene, divinylbiphenyl, divinylnaphthalene, diallyl phthalate, allyl (meth)acrylate, ethylene glycol di(meth)acrylate, diethylene glycol di(meth)acrylate and pentaerythritol di(meth)acrylate, and trifunctional or higher-functional crosslinkable monomers having three or more polymerizable functional groups, such as trimethylolpropane tri(meth)acrylate, ditrimethylolpropane tetra(meth)acrylate, pentaerythritol tri(meth)acrylate, pentaerythritol tetra(meth)acrylate, dipentaerythritol hexa(meth)acrylate, dipentaerythritol poly(meth)acrylate, and ethoxylates thereof. These crosslinkable monomers may be used alone or in combination of two or more.

From the point of view that the polymerization reaction is easily stabilized and hollow particles with high strength and high heat resistance are obtained, as the bifunctional crosslinkable monomer, divinylbenzene, ethylene glycol di(meth)acrylate and pentaerythritol di(meth)acrylate are preferred. Of them, ethylene glycol di(meth)acrylate and pentaerythritol di(meth)acrylate are preferred from the point of view that the shell thickness non-uniformity is easily suppressed.

From the point of view that the polymerization reaction is easily stabilized and hollow particles with high strength and high heat resistance are obtained, as the trifunctional or higher-functional crosslinkable monomer, pentaerythritol tetra(meth)acrylate, trimethylolpropane tri(meth)acrylate, ethoxylated trimethylolpropane tri(meth)acrylate, ethoxylated pentaerythritol tetra(meth)acrylate, pentaerythritol tri(meth)acrylate and dipentaerythritol poly(meth)acrylate are preferred. Of them, pentaerythritol tetra(meth)acrylate preferred from the point of view that the shell thickness non-uniformity easily suppressed.

From the point of view that the HSP distance between the crosslinkable monomer and the hydrophobic solvent easily falls within the above range, the total HSP of the crosslinkable monomer used in the production method of the present disclosure, is preferably from $17.50$ $MPa^{1/2}$ to $18.50$ $MPa^{1/2}$, more preferably from $17.60$ $MPa^{1/2}$ to $18.20$ $MPa^{1/2}$, and still more preferably from $17.70$ $MPa^{1/2}$ to $18.00$ $MPa^{1/2}$.

In 100 parts by mass of the polymerizable monomer, the content of the crosslinkable monomer is preferably 70 parts by mass or more, more preferably 80 parts by mass or more, and still more preferably 9 parts by mass or more. The polymerizable monomer itself may be composed of the crosslinkable monomer. When the content of the crosslinkable monomer is equal to or more than the lower limit value, the content of the crosslinkable monomer unit in the shell of the hollow particles is large enough. Accordingly, a covalent bond network is tightly strung in the shell. As a result, the shell thus formed is excellent in strength, is less likely to collapse, and is less likely to deform even when heat or the like is applied from the outside. In addition, when the content of the crosslinkable monomer is equal to or more than the lower limit value, phase separation easily occurs between the polymerizable monomer and the hydrophobic solvent in the droplets of the monomer composition, and the shell thickness non-uniformity is further suppressed.

In the production method of the present disclosure, the polymerizable monomer preferably contains at least a bifunctional crosslinkable monomer as the crosslinkable monomer. Accordingly, the HIP distance between the crosslinkable monomer and the hydrophobic solvent can be easily controlled within the above range. The polymerizable monomer preferably contains the bifunctional crosslinkable monomer in combination with the trifunctional or higher-functional crosslinkable monomer, from the point of view that the HSP distance between the crosslinkable monomer and the hydrophobic solvent can be easily controlled within the above range, and the covalent bond network is more tightly strung in the shell to further increase the shell strength.

The content of the bifunctional crosslinkable monomer in 100 parts by mass of the polymerizable monomer, is preferably 70 parts by mass or more and 100 parts by mass or less. When the polymerizable monomer contains the trifunctional or higher-functional crosslinkable monomer as the crosslinkable monomer, the upper limit of the content of the bifunctional crosslinkable monomer in 100 parts by mass of the polymerizable monomer, is preferably 95 parts by mass or less, and more preferably 90 parts by mass or less.

When the polymerizable monomer contains the trifunctional or higher-functional crosslinkable monomer as the crosslinkable monomer, the content of the trifunctional or higher-functional crosslinkable monomer in 100 parts by mass of the polymerizable monomer is not particularly limited. The lower limit is preferably 5 parts by mass or more, and more preferably 10 parts by mass or more. The upper limit is preferably 30 parts by mass or less.

[Non-Crosslinkable Monomer]

The polymerizable monomer may further contain crosslinkable monomer to the extent that does not impair the effects of the present disclosure.

As the non-crosslinkable monomer, a monovinyl monomer is preferably used. The monovinyl monomer is a compound having one polymerizable vinyl functional group. As the monovinyl monomer, examples include, but are not limited to, the following: (meth)acrylic monovinyl monomer such as methyl (meth)acrylate, ethyl (meth)acrylate, butyl (meth)acrylate, 2-ethylhexyl (meth)acrylate, lauryl (meth)acrylate, glycidyl (meth)acrylate, 2-hydroxyethyl (meth)acrylate and (meth)acrylic acid; an aromatic vinyl monomer such as styrene, vinyltoluene, α-methylstyrene, p-methylstyrene and halogenated styrene; a monoolefin monomer such as ethylene, propylene and butylene; a (meth)acrylamide monomer such as (meth)acrylamide, N-methylol (meth)acrylamide and N-butoxymethyl (meth)acrylamide and derivatives thereof; a diene monomer such as butadiene and isoprene; a carboxylic acid vinyl, ester monomer such as vinyl acetate; a vinyl halide monomer such as vinyl chloride; a vinylidene halide monomer such as vinylidene chloride; and vinylpyridine. These non-crosslinkable monomers may be used alone or in combination of two or more. Of them, from the viewpoint of reactivity and heat resistance, the (meth)acrylic monovinyl monomer is preferred, and at least one selected from butyl acrylate and methyl methacrylate is more preferred.

In 100 parts by mass of the polymerizable monomer, the content of the non-crosslinkable monomer is preferably 30 parts by mass or less, more preferably 20 parts by mass or less, and still more preferably it parts by mass or less, and it may be 0 part by mass. When the content of the non-crosslinkable monomer is equal to or less than the upper limit value, the content of the crosslinkable monomer is large enough. Accordingly, the strength and heat resistance of the shell are increased; phase separation is easily caused between the polymerizable monomer and the hydrophobic solvent in the droplets of the monomer composition; and the shell thickness non-uniformity is further suppressed.

The content of the polymerizable monomer in the mixture liquid is not particularly limited. From the viewpoint of the balance of the void ratio, particle diameter and mechanical strength of the hollow particles, with respect to the total mass (100% by mass) of the components (except for the aqueous medium) in the mixture liquid, the content of the polymerizable monomer is preferably from 15% by mass to 50% by mass, more preferably from 20% by mass to 40% by mass, and still more preferably from 20% by mass to 30% by mass.

From the viewpoint of increasing the mechanical strength of the hollow particles, the content of the polymerizable monomer is preferably 90% by mass or more, more preferably 95% by mass or more, and still more preferably 99% by mass or more, with respect to the total mass (100% by mass) of a solid component obtained by excluding the hydrophobic solvent from the material for the oil phase in the mixture liquid.

In the present disclosure, the solid component includes all components excluding a solvent, and a liquid polymerizable monomer and the like are included in the solid component.

(B) Hydrophobic Solvent

The hydrophobic solvent used in the production method of the present disclosure is a non-polymerizable, sparingly water-soluble organic solvent.

The hydrophobic solvent serves as a spacer material for forming the hollow portion in the interior of particles. In the suspension step described later, the suspension in which the droplets of the monomer compost ion containing the hydrophobic solvent are dispersed in the aqueous medium, is obtained. In the suspension step, phase separation occurs in the droplets of the monomer composition. As a result, the hydrophobic solvent with low polarity is likely to collect in the interior of the droplets of the monomer composition. In the end, according to their respective polarities, the hydrophobic solvent is distributed in the interior of the droplets of the monomer composition, and the material not containing the hydrophobic solvent is distributed at the periphery of the droplets of the monomer composition.

Then, in the polymerization step described later, an aqueous dispersion containing the hollow particles including the hydrophobic solvent, is obtained. That is, since the by hydrophobic solvent collects in the interior of the particles, the hollow portion filled with the hydrophobic solvent is formed in the interior of the obtained precursor particles.

Depending on the type of the crosslinkable monomer, the hydrophobic solvent is appropriately selected so that the HSP distance between the crosslinkable monomer and the hydrophobic solvent is 5.80 or more and 6.50 or less.

The hydrophobic solvent is not particularly limited, and a conventionally-known hydrophobic solvent may be used. As the hydrophobic solvent, examples include, but are not limited to, esters such as ethyl acetate and butyl acetate; ether esters such as propylene glycol monomethyl ether acetate and propylene glycol monoethyl ether acetate; aromatic hydrocarbons such as benzene, toluene and xylene; and aliphatic hydrocarbons such as hexane, methylhexane, heptane, octane, cyclohexane and methylcyclohexane. These hydrophobic solvents may be used alone or in combination of two or more.

From the point of view that the HSP distance between the crosslinkable monomer and the hydrophobic solvent easily falls within the above range, the hydrophobic solvent preferably contains one or more selected from the group consisting of esters, aromatic hydrocarbons and aliphatic hydrocarbons, and more preferably one or more selected from the group consisting of aromatic hydrocarbons and aliphatic hydrocarbons.

From the point of view that the HSP distance between the crosslinkable monomer and the hydrophobic solvent easily falls within the above range, the hydrophobic solvent preferably contains two or more kinds of hydrophobic solvents. The combination of the two or more kinds of hydrophobic solvents is not particularly limited and is appropriately selected so that the HSP distance falls within the above range. The combination is preferably a combination of one or more selected from aliphatic hydrocarbons and one or more selected from esters and aromatic hydrocarbons, and more preferably a combination of one or more selected from aliphatic hydrocarbons and one or more selected from esters, or a combination of one or more selected from aliphatic hydrocarbons and one or more selected from aromatic hydrocarbons.

In the above combinations, the one or more aliphatic hydrocarbons are preferably one or more selected from the group consisting of hexane, methylhexane, cyclohexane and methylcyclohexane, more preferably one or more selected from hexane and cyclohexane, and still more preferably cyclohexane.

In the above combinations, the one or more esters are preferably one or more selected from ethyl acetate and butyl acetate, and more preferably ethyl acetate.

In the above combinations, the one or more aromatic hydrocarbons are preferably one or more selected from benzene, toluene and xylene, and more preferably toluene.

In the hydrophobic solvent used in the production method of the present disclosure, the total mass of the hydrophobic solvents of any one of the above-mentioned preferred combinations contained in the total mass (100 parts by mass) of the hydrophobic solvent, is preferably 70 parts by mass or more, more preferably 80 parts by mass or more, still more preferably 90 parts by mass or more, even more preferably 95 parts by mass or more, and particularly preferably 99 parts by mass or more. The hydrophobic solvent used in the production method of the present disclosure is most preferably composed of any one of the above-mentioned preferred combinations of the hydrophobic solvents.

In the hydrophobic solvent containing the combination of the one or more aliphatic hydrocarbons and the one or more esters, the mass ratio between the aliphatic hydrocarbons and the esters (aliphatic hydrocarbons:esters) is not particularly limited, and it is preferably from 70:30 to 95:5, and more preferably from 80:20 to 95:5.

In the hydrophobic solvent containing the combination of the one or more aliphatic hydrocarbons and the one or more aromatic hydrocarbons, the mass ratio between the aliphatic hydrocarbons and the aromatic hydrocarbons (aliphatic hydrocarbons:aromatic hydrocarbons) is not particularly limited, and it is preferably from 20:80 to 80:20, and more preferably from 30:70 to 70:30.

The total HSP of the hydrophobic solvent used in the production method of the present disclosure is not particularly limited. From the point of view that the HSP distance between the crosslinkable monomer and the hydrophobic solvent easily fails within the above range, the total HSP of the hydrophobic solvent is preferably from 16.50 MPa$^{1/2}$ to 18.00 MPa$^{1/2}$, more preferably from 16.60 MPa$^{1/2}$ to 17.80 MPa$^{1/2}$, and still more preferably from 16.70 MPa$^{1/2}$ to 17.70 MPa$^{1/2}$.

The boiling point of the hydrophobic solvent is not particularly limited. From the viewpoint of ease of removal in the solvent removal step described later, the boiling point the hydrophobic solvent is preferably 130° C. or less, and more preferably 120° C. or less. On the other hand, the boiling point of the hydrophobic solvent is preferably 50° C. or more, and more preferably 60° C. or more, from the point of view that the hydrophobic solvent can be easily included in the precursor particles.

When the Hydrophobic solvent is a mixed solvent containing several kinds of hydrophobic solvents and it has several boiling points, the boiling point of the solvent having the highest boiling point among the solvents contained in the mixed solvent, is preferably equal to or less than the upper limit value, and the boiling point of the solvent having the lowest boiling point among the solvents contained in the mixed solvent, is preferably equal to or more than the lower limit value.

For example, preferred combination whereby the HSP distance between the crosslinkable monomer and the hydrophobic solvent is 5.80 or more and 6.50 or less, is as follows: the crosslinkable monomer contains at least one selected from ethylene glycol di(meth)acrylate, pentaerythritol di(meth)acrylate and pentaerythritol tetra(meth)acrylate; with respect to 100 parts by mass of the crosslinkable monomer, the total content of the ethylene glycol di(meth)acrylate, pentaerythritol di(meth)acrylate and pentaerythritol tetra(meth)acrylate is preferably 70 by mass or more, more preferably 80 parts mass or more, still more preferably 90 parts by mass or more, and even more preferably 100 parts by mass; the hydrophobic solvent contains a combination of one or more selected from hexane and cyclohexane and one or more selected from ethyl acetate and toluene; and with respect to 100 parts by mass of the hydrophobic solvent, the total content of the hexane, cyclohexane, ethyl acetate and toluene is preferably 70 parts by mass or more, more preferably 80 parts by mass or more, still more preferably 90 parts by mass or more, and even more preferably 100 parts by mass.

The crosslinkable monomer is more preferably crosslinkable monomer which contains at least ethylene glycol di(meth)acrylate and in which, with respect to 100 parts mass of the crosslinkable monomer, the content of the ethylene glycol di(meth)acrylate 70 parts by mass or more.

The hydrophobic solve t is more preferably a hydrophobic solvent which contains a combination of toluene and one or more selected from hexane and cyclohexane and in which, with respect to 100 parts by mass of the hydrophobic solvent, the total content the hexane, cyclohexane and toluene is preferably 70 parts by mass or more, more preferably 80 parts by mass or more, still more preferably 90 parts mass or more, and even more preferably 100 parts by mass. Another more preferable hydrophobic solvent is a hydrophobic solvent which contains a combination of ethyl acetate and one or more selected from hexane and cyclohexane and in which, with respect to 100 parts by mass of the hydrophobic solvent, the total content of the hexane, cyclohexane and ethyl acetate is preferably 70 parts by mass or more, more preferably 80 parts by mass or more, still more preferably 90 parts by mass or more, and even more preferably 100 parts by mass.

As the hydrophobic solvent such that the HSP distance between the hydrophobic solvent and ethylene glycol dimethacrylate (a preferred crosslinkable monomer) is 5.80 or more and 6.50 or less, examples include, but are not limited to, a mixed solvent of cyclohexane and toluene in a mass ratio of 50:50 (the HSP distance between the hydrophobic solvent and ethylene glycol dimethacrylate: 6.04), a mixed solvent of cyclohexane and toluene in a mass ratio of 70:30 (the HSP distance between the hydrophobic solvent and ethylene glycol dimethacrylate: 6.40), a mixed solvent of cyclohexane and toluene in a mass ratio of 40:60 (the HSP distance between the hydrophobic solvent and ethylene glycol dimethacrylate: 5.91), a mixed solvent of cyclohexane and ethyl acetate in a mass ratio of 90:10 (the HSP distance between the hydrophobic solvent and ethylene glycol dimethacrylate: 6.01), a mixed solvent of hexane and toluene in a mass ratio of 60:40 (the HSP distance between the hydrophobic solvent and ethylene glycol dimethacrylate: 6.03), and a mixed solvent of hexane and ethyl acetate in a mass ratio of 80:20 (the HSP distance between the hydrophobic solvent and ethylene glycol dimethacrylate: 5.83).

As the hydrophobic solvent such that 5.80 or more and 6.50 or less is the HSP distance between the hydrophobic solvent and the crosslinkable monomer which is a mixture of ethylene glycol dimethacrylate and pentaerythritol tetraacrylate (preferred crosslinkable monomers) in a mass ratio of 70:30 to 90:10, examples include, but are not limited to, the same hydrophobic solvents as those such that the HSP distance between the hydrophobic solvent and ethylene glycol dimethacrylate is 5.80 or more and 6.50 or less.

The void ratio of the hollow particles can be controlled by changing the amount of the hydrophobic solvent in the mixture liquid. In the suspension step described later, the polymerization reaction progresses while oil droplets containing the crosslinkable monomer and so on include the hydrophobic solvent. Accordingly, as the content of the hydrophobic solvent increases, the void ratio of the obtained hollow particles tends to increase.

In the present disclosure, with respect to 100 parts by mass of the polymerizable monomer, the content of the hydrophobic solvent in the mixture liquid is preferably 50 parts by mass or more and 500 parts by mass or less, from the following viewpoints: the particle diameter of the hollow particles is easily controlled; the void ratio is easily increased while maintaining the strength of the hollow particles; and the amount of the residual hydrophobic solvent in the hollow particles is easily reduced. With respect to 100 parts by mass of the polymerizable monomer, the content of the hydrophobic solvent in the mixture liquid is more preferably 60 parts by mass or more and 400 parts by mass or less, and still more preferably 70 parts by mass or more and 300 parts by mass or less.

(C) Polymerization Initiator

In the production method of the present disclosure, the mixture liquid preferably contains an oil-soluble polymerization initiator as the polymerization initiator. As the method for polymerizing the droplets of the monomer composition after suspending the mixture liquid, examples include an emulsion polymerization method using a water-soluble polymerization initiator and a suspension polymerization method using an oil-soluble polymerization initiator. By using the oil-soluble polymerizaton initiator, suspension polymerizaton can be performed.

The oil-soluble polymerization initiator is not particularly limited, as long as it is a lipophilc one having a solubility in water of 0.2% by mass or less. As the oil-soluble polymerization initiator, examples include, but are not limited to, benzoyl peroxide, lauroyl peroxide, t-butyl peroxide 2-ethylhexanoate, 2,2'-azobis(2,4-dimethylvaleronitrile) and azobis(isobutyronitrile).

With respect to 100 parts by mass of the polymerizable monomer in the mixture liquid, the content of the oil-soluble polymerization initiator is preferably from 0.1 parts by mass to parts by mass, more preferably from 0.5 parts by mass to 7 parts by mass, and still more preferably from 1 part by mass to parts by mass. When the content of the oil-soluble polymerization initiator is within the above range, a polymerization reaction can progress sufficiently; the oil-soluble polymerization initiator is less likely to remain after the end of the polymerization reaction; and an unexpected side reaction is less likely to progress.

(D) Dispersion Stabilizer

The dispersion stabilizer is an agent for dispersing the droplets of the monomer composition in the aqueous medium in the suspension step. In the present disclosure, an inorganic dispersion stabilizer is preferably used as the dispersion stabilizer, from the point of view that the particle diameter of the droplets can be easily controlled in the suspension and the particle size distribution of the obtained hollow particles can be sharp, and that an excessive decrease in the shell thickness is suppressed, and a decrease in the strength of the hollow particles is suppressed. The inorganic dispersion stabilizer can exert such effects especially when the inorganic dispersion stabilizer is used in combination with the particle diameter control agent described later.

As the inorganic dispersion stabilizer, examples include, but are not limited to, inorganic compounds including a sulfate such as barium sulfate and calcium sulfate; a carbonate such as barium carbonate, calcium carbonate and magnesium carbonate; a phosphate such as calcium phosphate; a metal oxide such as aluminum oxide and titanium oxide; and a metal hydroxide such as aluminum hydroxide, magnesium hydroxide, calcium hydroxide, barium hydroxide and iron(II)hydroxide. These inorganic dispersion stabilizers may be used alone or in combination of two or more.

Of these inorganic dispersion stabilizers, a sparingly water-soluble metal salt such as the above-mentioned sulfate, carbonate, phosphate and metal hydroxide is preferred; a metal hydroxide is more preferred; and a magnesium hydroxide particularly preferred.

In the present disclosure, the sparingly water-soluble metal salt is preferably an inorganic metal salt such that the solubility in 100 g of water is 0.5 g or less.

In the present disclosure, the sparingly water-soluble inorganic dispersion stabilizer is particularly preferably used in the form of colloidal particles being dispersed in the aqueous medium, that is, in the form of a colloidal dispersion containing the sparingly water-soluble, inorganic dispersion stabilizer colloidal particles. By using the sparingly water-soluble inorganic dispersion stabilizer in the form of the colloidal dispersion containing the sparingly water-soluble inorganic dispersion stabilizer colloidal particles, the particle size distribution of the droplets of the monomer composition can be sharp; moreover, the amount of the residual inorganic dispersion stabilizer in the obtained hollow particles can be easily reduced by washing.

The colloidal dispersion containing the sparingly water-soluble inorganic dispersion stabilizer colloidal particles can be prepared by, for example, reacting at least one selected from alkali metal hydroxide salts and alkaline earth metal hydroxide salts with a water-soluble polyvalent metal salt, which is not an alkaline earth metal hydroxide salt, in the aqueous medium.

As the alkali metal hydroxide salts, examples include, but are not limited to, lithium hydroxide, sodium hydroxide and potassium hydroxide. As the alkaline earth metal hydroxide salts, examples include, but axe not limited to, barium hydroxide and calcium hydroxide.

The water-soluble polyvalent metal salt may be a water-soluble polyvalent metal salt other than compounds corresponding to the above-mentioned alkaline earth metal hydroxide salts. As the polyvalent metal salt, examples include, but are not limited to, magnesium metal salts such as magnesium chloride, magnesium phosphate and magnesium sulfate; calcium metal salts such as calcium chloride, calcium nitrate, calcium acetate and calcium sulfate; aluminum metal salts such as aluminum chloride and aluminum sulfate; barium salts such as barium chloride, barium nitrate and barium acetate; and zinc salts such as zinc chloride, zinc nitrate and zinc acetate. Among them, magnesium metal salts, calcium metal salts and aluminum metal salts are preferred; magnesium metal salts are more preferred; and magnesium chloride is particularly preferred. The water-soluble polyvalent metal salts may be used alone or in combination of two or more.

The method for reacting the water-soluble polyvalent metal salt with the at least one selected from alkali metal hydroxide salts and alkaline earth metal hydroxide salts in the aqueous medium, is not particularly limited. As the method, examples include, but are not limited to, mixing an aqueous solution of the water-soluble polyvalent metal salt and an aqueous solution of the at least one selected from alkali metal hydroxide salts and alkaline earth metal hydroxide salts. In this method, from the point of view that the particle diameter of the sparingly water-soluble metal hydroxide colloidal particles can be suitably controlled, it is preferable to mix the aqueous solutions by, while stirring the aqueous solution of the water-soluble polyvalent metal salt, gradually adding the aqueous solution of the at least one selected from alkali metal hydroxide salts and alkaline earth metal hydroxide salts to the aqueous solution of the water-soluble polyvalent metal salt.

From the viewpoint of obtaining the hollow particles having a volume average particle diameter of 10 μm or more and 50 μm or less, it is preferable to use a colloidal dispersion obtained by reacting the water-soluble polyvalent metal salt with the at least one selected from alkali metal hydroxide salts and alkaline earth metal hydroxide salts at a temperature of 40° C. or more and 90° C. or less in the aqueous medium.

The content of the dispersion stabilizer is not particularly limited. With respect to the total mass (100 parts by mass) of the polymerizable monomer and the hydrophobic solvent, the content of the dispersion stabilizer is preferably from 0.5 parts by mass to 10 parts by mass, and more preferably from 1.0 part by mass to 8.0 parts by mass. When the content of the dispersion stabilizer is equal to or more than the lower limit value, the droplets of the monomer composition can be sufficiently dispersed in the suspension so that they do not join together. On the other hand, when the content of the dispersion stabilizer is equal to or less than the upper limit value, an increase in the viscosity of the suspension is prevented in the formation of the droplets, and a problem such that a droplet forming machine is clogged with the suspension, can be avoided.

With respect to 100 parts by mass of the aqueous medium, the content of the dispersion stabilizer is generally 2 parts by mass or more and 15 parts by mass or less, and preferably 3 parts by mass or more and 8 parts by mass or less.

(E) Aqueous Medium

In the present disclosure, the term "aqueous medium" means a medium selected from the group consisting of water, a hydrophilic solvent and a mixture thereof.

The hydrophilic solvent in the present disclosure is not particularly limit as long as it is one that mixes with water sufficiently and does not develop phase separation.

Examples of the hydrophilic solvent include alcohols such as methanol and ethanol; tetrahydrofuran (THF); and dimethyl sulfoxide (DMSO).

Among the aqueous med a water is preferably used in terms of its high polarity. When a mixture of water and a hydrophilic solvent is used, from the viewpoint of forming the droplets of the monomer composition, is important that the polarity of the entire mixture is not too low. In this case, for example, the mass ratio between water and the hydrophilic solvent (water hydrophilic solvent) may be set to 99:1 to 50:50.

(F) Other Materials

The mixture liquid may further contain other materials that are different from the above-mentioned materials (A) to (E), to the extent that does not impair the effects of the present disclosure.

As another material, the mixture liquid preferably contains a particle diameter control agent. When the mixture liquid contains the particle diameter control agent, the particle diameter of the droplets of the monomer composition and the thickness of the shell of the obtained hollow particles can be appropriately controlled.

As the particle diameter control agent, for example, at least one selected from the group consisting of rosin acids, higher fatty acids and metal salts thereof, or a polar resin described later, can be used. In the suspension step described later, the particle diameter control agent can appropriately control the particle diameter of the droplets of the monomer composition containing the polymerizable monomer and the hydrophobic solvent. In the suspension step, the droplets of the monomer composition are formed in the aqueous medium by the action of the dispersion stabilizer. In the droplets of the monomer composition, phase separation occurs between the hydrophobic solvent and the material containing the polymerizable monomer and not containing the hydrophobic solvent; the hydrophobic solvent is distributed in the center; and the material not containing the hydrophobic solvent distributed on the surface side. When the mixture liquid contains the particle diameter control agent, the droplets are presumed to have the following structure: the particle diameter control agent is distributed in the vicinity of the surface or the droplets of the monomer composition, and the dispersion stabilizer is on the surface of the droplets. Such a material distribution structure is formed according to differences in affinity for the aqueous medium between the materials. When the mixture liquid contains the particle diameter control agent, the particle diameter of the droplets of the monomer composition can be appropriately controlled. This is thought to be because the droplets of the monomer composition in the suspension have the above-mentioned material distribution structure, an interaction between the dispersion stabilizer and the particle diameter control agent occurs on the surface of the droplets, and the dispersibility of the droplets by the dispersion stabilizer is changed.

The particle diameter control agent is preferably at least one selected from the group consisting of rosin acids, higher fatty acids and metal salts thereof, and more preferably at least one selected from rosin acids and alkali metal salts thereof, since the particle diameter of the droplets of the monomer composition and the thickness of the shell of the hollow particles can be appropriately controlled with a small amount of the particle diameter control agent.

The rosin acids preferably used as the particle diameter control agent can be obtained from rosin such as gum rosin, tall rosin and wood rosin.

The components contained in the rosin acids obtained from the rosin are, for example, abietic acid, dehydroabietic acid, palustric acid, isopimaric acid and pimaric acid. The component ratio of the rosin acids is diverse, and it varies depending on the type of the rosin, the type and growing area of pine which is a raw material of rosin, etc.

The rosin acids and metal salts thereof used in the present disclosure are more preferably rosin acids containing 50% by mass or more of an abietic acid compound such as abietic acid, dehydroabietic acid, palustric acid and hydrides thereof, and alkali metal salts of the rosin acids.

The higher fatty acids used as the particle diameter control agent are preferably higher fatty acids containing 10 to 25 carbon atoms in which the carbon atom of the carboxyl group is excluded. As such higher fatty acids, for example, lauric acid ($CH_3(CH_2)_{12}COOH$), tridecanoic acid ($CH_3(CH_2)_{11}COOH$), myristic acid ($CH_3(CH_2)_{12}COOH$), pentadecanoic acid ($CH_3(CH_2)_{13}COOH$), palmitic acid ($CH_3(CH_2)_{14}COOH$), heptadecanoic acid ($CH_3(CH_2)_{15}COOH$), stearic acid ($CH_3(CH_2)_{16}COOH$), arachidic acid ($CH_3(CH_2)_{18}COOH$), behenic acid ($CH_3(CH_2)_{20}COOH$) and lignoceric acid ($CH_3(CH_2)_{22}COOH$) are preferred.

As the metal used in the metal salts of the rosin acid or higher fatty acids, examples include, but are not limited to, an alkali metal such as Li, Na, and K, and an alkaline-earth metal such as Mg and Ca. Of them, an alkali metal is preferred, and at least one selected from Li, Na and K is more preferred.

When at least one selected from the group consisting of rosin acids, higher fatty acids and metal salts thereof is used as the particle diameter control agent, the total content of the rosin acids, higher fatty acids and metal salts thereof is preferably 0.0001 parts by mass or more and 0.1 parts by mass or less, more preferably 0.001 parts by mass or more and 0.01 parts by mass or less, and more preferably 0.0015 parts by mass or more and 0.006 parts by mass or less, with respect to the total (100 parts by mass) of the polymerizable monomer and the hydrophobic solvent. When the total content is equal to or more than the lower limit value, the particle diameter of the hollow particles and the thickness of the shell can be easily controlled, and the strength of the hollow particles can be increased. On the other hand, when the total content is equal to or less than the upper limit value, a decrease in the content of the polymerizable monomer can be suppressed. Accordingly, decrease in the strength of the shell can be suppressed, and a collapse of the hollow particles can be further suppressed.

The polar resin that is preferably used as the particle diameter control agent, is a polymer containing a repeating unit which contains a heteroatom. As the polar resin, examples include, but are not limited to, an acrylic resin, a polyester resin, and a vinyl resin containing a heteroatom.

The polar resin may be a homopolymer or copolymer of a heteroatom-containing monomer, or it may be a copolymer of a heteroatom-containing monomer and a heteroatom-free monomer. When the polar resin is a copolymer of a heteroatom-containing monomer and a heteroatom-free monomer, from the viewpoint of easily controlling the particle diameter of the hollow particles, in 100% by mass of all the repeating units constituting the copolymer, the amount of the heteroatom-containing, monomer unit is preferably 50% by mass or more, more preferably 70% by mass or more, and still more preferably 90% by mass or more.

As the heteroatom-containing monomer for the polar resin, examples include, but are not limited to, a (meth)acrylic monovinyl monomer which is a monomer containing a (meth)acryloyl group, such as methyl (meth)acrylate, ethyl (meth)acrylate, butyl (meth)acrylate, 2-ethylhexyl (meth) acrylate, lauryl (meth)acrylate, acrylic acid, methacrylic acid, 2-hydroxyethyl (meth)acrylate, 2-hydroxypropyl (meth)acrylate, 4-hydroxybutyl (meth)acrylate, methoxypolyethylene glycol (meth)acrylate, dimethylaminoethyl (meth)acrylate, diethylaminoethyl (meth)acrylate, glycidyl (meth)acrylate, and 4-hydroxybutyl acrylate glycidyl ether; an aromatic vinyl monomer containing a heteroatom, such as halogenated styrene and styrene sulfonate; a carboxylic acid vinyl ester monomer such as vinyl acetate; a vinyl halide monomer such as vinyl chloride; a vinylidene halide monomer such as vinylidene chloride; vinylpyridine; a carboxyl group-containing monomer such as an ethylenically unsaturated carboxylic acid monomer such as crotonic acid, cinnamic acid, itaconic acid, fumaric acid, maleic acid and butene tricarboxylic acid; and an epoxy group-containing monomer such as allyl glycidyl ether. These heteroatom-containing monomers may be used alone or in combination of two or more.

As the heteroatom-free monomer for the polar resin, examples include, but are not limited to, an aromatic vinyl monomer not containing a heteroatom, such as styrene, vinyltoluene, α-methylstyrene and p-methylstyrene; a monoolefin monomer such as ethylene, propylene and butylene; and a diene monomer such as butadiene and isoprene. These heteroatom-free monomers may be used alone or in combination of two or more.

From the viewpoint of high compatibility with the polymerizable monomer and easily controlling the particle diameter of the hollow particles, the polar resin is preferably an acrylic resin. In the acrylic resin, with respect to 100% by mass of all the repeating units constituting the resin, the total mass of the (meth)acrylic monovinyl monomer unit is preferably 50% by mass or more, more preferably 70% by mass or more, and still more preferably 90% by mass or more. The polar resin is particularly preferably an acrylic resin such that all the repeating units constituting the resin are composed of the (meth)acrylic monovinyl monomer unit.

In the polar resin, from the viewpoint of easily controlling the particle diameter of the hollow particles, it is preferable that the heteroatom-containing monomer unit contains a polar group-containing monomer unit that contains a polar group selected from a carboxyl group, a hydroxyl group, a sulfonic acid group, an amino group, a polyoxyethylene group and an epoxy group. As the polar group-containing monomer used in the polar resin, examples include, but are not limited to, a carboxyl group-containing monomer such as an ethylenically unsaturated carboxylic acid monomer (e.g., (meth)acrylic acid, crotonic acid, cinnamic acid, itaconic acid, fumaric acid, maleic acid and butene tricarboxylic acid); a hydroxyl group-containing monomer such as 2-hydroxyethyl (meth)acrylate, 2-hydroxypropyl (meth) acrylate and 4-hydroxybutyl (meth)acrylate; a sulfonic acid group-containing monomer such as styrenesulfonic acid; an amino group-containing monomer such as dimethylaminoethyl (meth)acrylate and diethylaminoethyl (meth)acrylate; a polyoxyethylene group-containing monomer such as methoxypolyethylene glycol (meth)acrylate; and an epoxy group-containing, monomer such as glycidyl (meth)acrylate, allyl glycidyl ether and 4-hydroxybutyl acrylate glycidyl ether. The polar group-containing monomers may be used alone or in combination of two or more. As the polar group contained in the polar group-containing monomer unit contained in the polar resin, a carboxyl group and a hydroxyl group are preferred, from the point of view that the particle diameter can be controlled by adding a small amount thereof.

When the polar resin contains the polar group-containing monomer unit, it is preferable that the polar group is present at the end of the main chain or that of a side chain, or the polar group is bound to the main chain or a side chain in a pendant form, from the point of view that the polar resin can be easily disposed on the outer surface of the hollow particles and that the particle diameter of the hollow particles can be easily controlled.

When the polar resin does not contain the polar group-containing monomer unit, viewpoint containing monomer from the of high compatibility with the polymerizable monomer and easily controlling the particle diameter of the hollow particles, the polar resin preferably contains a monomer unit derived from a (meth)acrylic acid alkyl ester as the heteroatom-containing monomer unit. Especially from the viewpoint of high polarity, the polar resin preferably contains a monomer unit derived from a (meth)acrylic acid alkyl ester in which the alkyl group has 3 or less carbon atoms, more preferably a monomer unit derived from a (meth) acrylic acid alkyl ester in which the alkyl group is a methyl group or an ethyl group, and still more preferably a monomer unit derived from a (meth)acrylic acid alkyl ester in which the alkyl group is a methyl group.

From the viewpoint of high compatibility with the polymerizable monomer and easily controlling the particle diameter of the hollow particles, the acrylic resin as the polar resin is preferably a polymer or copolymer of polymerizable monomers for polar resin, which include 50% by mass or more of methyl methacrylate with respect to the total mass (100% by mass) of the polymerizable monomers for polar resin. In the present disclosure, the polymerizable monomer used for synthesis of the polar resin is referred to as the "polymerizable monomer for polar resin".

The polar resin can be obtained by, for example, polymerizing polymerizable monomers for polar resin, which include the heteroatom-containing monomer, by a polymerization method such as solution polymerization and emulsion polymerization.

When the polar resin is a copolymer, the copolymer may be any one of a random copolymer, a block copolymer and a graft copolymer. The polar resin is preferably a random copolymer.

From the viewpoint of increasing the solubility, the polar resin is preferably finely pulverized.

The number average molecular weight (Mn) of the polar resin not particularly limited. The polystyrene equivalent number average molecular weight (Mn) of the polar resin measured by gel permeation chromatography (GPC) using tetrahydrofuran preferably in a range of 3000 or more and 20000 or less, more preferably in a range of 4000 or more and 17000 or less, and still more preferably in a range of 6000 or more and 15000 or less. When the number average molecular weight (Mn) of the polar resin is equal to or more than the lower limit value, the solubility of the polar resin increased, and the particle diameter of the hollow particles can be easily controlled. When the number average molecular weight of the polar resin is equal to or less than the upper limit value, a decrease in the strength of the shell can be suppressed.

When the polar resin is used as the particle diameter control agent, the content of the polar resin is preferably 0.1 parts by mass or more and 10.0 parts by mass or less, more preferably 0.3 parts by mass or more and 8.0 parts by mass or less, and still more preferably 0.5 parts by mass or more and 8.0 parts by mass or less, with respect to 100 parts by mass of the polymerizable monomer. When the content of the polar resin is equal to or more than the lower limit value, the particle diameter of the hollow particles and the thickness of the shell can be easily controlled, and the strength of the hollow particles can be increased. On the other hand, when the contend of the polar resin is equal to or less than the upper limit value, a decrease in the content of the polymerizable monomer can be suppressed. Accordingly, a decrease in the strength of the shell flan be suppressed, and a collapse the hollow particles can be further suppressed.

The mixture quid is obtained by mixing the above-mentioned materials and other materials as needed, appropriately stirring mixture, etc. In the mixture liquid, an oil phase containing the lipophilic materials such as (A) the polymerizable monomer, (B) the hydrophobic solvent and (C) the polymerization initiator is dispersed with a size of a particle diameter of approximately several millimeters in an aqueous phase containing (D) the dispersion stabilizer, (E) the aqueous medium, etc. The dispersion state of these materials in the mixture can be observed with the naked eye, depending on the types of the materials.

In the mixture liquid preparation step, the mixture liquid may be obtained by simply mixing the above-mentioned materials and other materials as needed, appropriately stirring the mixture, etc. From the point of view that the shell can be easily uniform, it is preferable to prepare the mixture liquid by separately preparing the oil phase containing the polymerizable monomer, the hydrophobic solvent and the polymerization initiator with the aqueous phase containing the dispersion stabilizer and the aqueous medium in advance, and then mixing the phases together. In the present disclosure, a colloidal dispersion in which a sparingly water-soluble inorganic dispersion stabilizer is dispersed in the form of colloidal particles in the aqueous medium, can be preferably used as the aqueous phase.

As just described, by separately preparing the oil phase and the aqueous phase in advance and then mixing them, hollow particles such that the composition of the shell portion is uniform, can be produced. Also, the particle diameter of the hollow particles can be easily controlled.

(2) Suspension Step

The suspension step includes suspending the mixture liquid to prepare the suspension in which the droplets of the monomer composition containing the hydrophobic solvent are dispersed in the aqueous medium.

The suspension method for forming the droplets of the monomer composition is not particularly limited. For example, it is performed using an apparatus capable of performing strong stirring, such as an (in-line type) emulsifying disperser (e.g., a horizontal in-line type disperser such as MILDER (product name, manufactured by Pacific Machinery & Engineering Co., Ltd.) and CAVITRON (product name, manufactured by EUROTEC, Ltd.) and a vertical in-line type disperser such as DRS 2000/5 (product name, manufactured by IKA Works, Inc.)) and a high-speed emulsifying disperser such as T.K. HOMOMIXER MARK II (product name, manufactured by PRIMIX Corporation).

In the suspension prepared in the suspension step, the droplets of the monomer composition containing the lipophilic materials mentioned above and having a particle diameter of approximate y from 10 μm to 50 μm, are dispersed uniformly in the aqueous medium. Such droplets of the monomer composition are difficult to observe with the naked eye and can be observed with a known observation instrument such as an optical microscope.

In the suspension step, since phase separation occurs in the droplets of the monomer composition e hydrophobic solvent with low polarity is likely to collect in the interior of the droplets. As a result, in the obtained droplets, the hydrophobic solvent is distributed in the interior thereof, and the material not containing the hydrophobic solvent is distributed at the periphery thereof.

Figure 2:
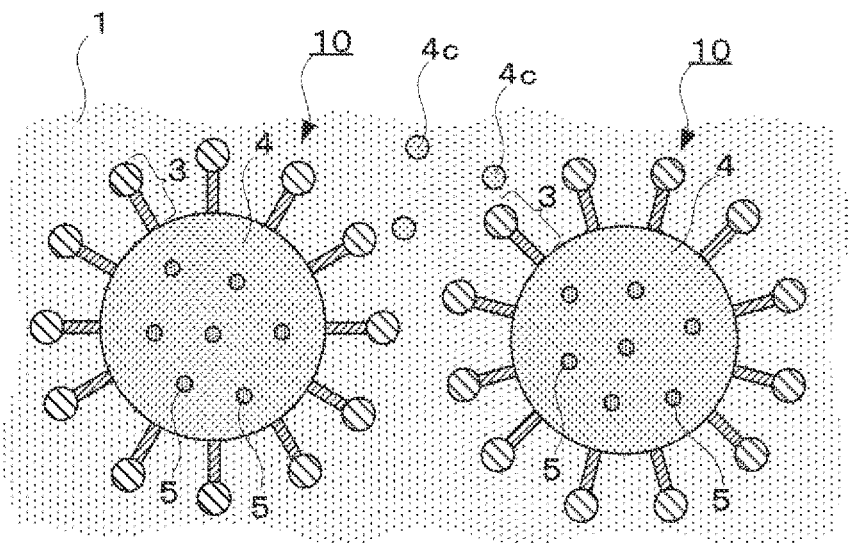
FIG. 2 is a schematic diagram showing an embodiment of a suspension in a suspension step.

FIG. 2 is a schematic diagram showing an embodiment the suspension in the suspension step. Each droplet 10 of the monomer composition in FIG. 2 schematically shows a cross section thereof. FIG. 2 is merely a schematic diagram, and the suspension in the present disclosure is not limited to that shown in FIG. 2. A part of FIG. 2 corresponds to the diagram (2) of FIG. 1 described above.

FIG. 2 shows a state where the droplets 10 of the monomer composition and the polymerizable monomer 4c dispersed in the aqueous medium are dispersed in the aqueous medium 1. Each droplet 10 is formed by the oil-soluble monomer composition and a dispersion stabilizer 3 surrounding the periphery of the oil-soluble monomer composition 4.

The monomer composition contains the oil-soluble polymerization initiator 5, the polymerizable monomer and the hydrophobic solvent (none of them is illustrated).

Each droplet 10 is a minute oil droplet which contains the monomer composition 4, and the oil-soluble polymerization initiator 5 generates polymerization initiating radicals in the interior of the minute oil droplet. Therefore, the precursor particles with a target particle diameter can be produced without excessive growing the minute oil droplet.

In such a suspension polymerization method using the oil-soluble polymerization initiator, there is no opportunity for the polymerization initiator to come into contact with the polymerizable monomer 4c dispersed in the aqueous medium 1. Thus, the subgeneration of surplus resin particles (e.g., solid particles having a relatively small particle diameter) in addition to the target resin particles having the hollow portion, can be suppressed by using the oil-soluble polymerization initiator.

(3) Polymerization Step

The polymerization step includes subjecting the suspension obtained by the suspension step to a polymerization reaction to prepare a precursor composition containing precursor particles which have a hollow portion surrounded by shell containing a resin and which include the hydrophobic solvent in the hollow portion. The precursor particles are formed by polymerization of the polymerizable monomer contained in the droplets of the monomer composition. The shell of the precursor particles contains the polymer of the polymerizable monomer as the resin.

The polymerization system is not particularly limited. For example, a batch system, a semicontinuous system or a continuous system may be employed.

The polymerization temperature is preferably from 0° C. to 80° C., and more preferably from 50° C. to 70° C.

The temperature increase rate up to the polymerization temperature, is preferably from 10° C./h to 60° C./h, and more preferably from 15° C./h to 55° C./h.

The polymerization reaction time is preferably from 1 hour to 20 hours, and more preferably from 2 hours to 15 hours.

In the polymerization step, the shell portion of the droplets of the monomer composition, which contain the hydrophobic solvent in the interior, polymerizes. Accordingly, as described above, the hollow portion filled with the hydrophobic solvent is formed in the interior of the obtained precursor particles.

(4) Solid-Liquid Separation Step

The solid-liquid separation step includes performing solid-liquid separation of the precursor composition which contains the precursor particles and which is obtained by the above-described polymerization step, to obtain a solid component containing the precursor particles.

The method of performing the solid-liquid separation of the precursor composition is not particularly limited, and a known method may be used. Examples of the solid-liquid separation method include a centrifugation method, a filtration method, and still-standing separation. Among them, a centrifugation method or a filtration method may be employed, and from the viewpoint of simplicity of the operation, a centrifugation method may be employed.

Any step such as a preliminary drying step may be performed at a time after the solid-liquid separation step and before performing the solvent removal step described later. Examples of the preliminary drying step include performing preliminary drying on the solid component obtained after the solid-liquid separation step, by use of a drying apparatus such as a dryer and a drying appliance such as a hand dryer.

(5) Solvent Removal Step

The solvent removal step includes removing the hydrophobic solvent from the precursor particles obtained by the solid-liquid separation step.

By removing the hydrophobic solvent from the precursor particles in a gaseous atmosphere, the hydrophobic solvent in the interior of the precursor particles is substituted with air, and the hollow particles filled with gas are obtained.

In this step, the term "in a gaseous atmosphere" includes "in an environment where no liquid component exists in the outside of the precursor particles" and "in an environment where only a very small amount of liquid component at a level that does not influence the removal of the hydrophobic solvent, exists in the outside of the precursor particles" in a strict sense. The term "in a gaseous atmosphere" can be reworded as a state where the precursor particles do not exist in a slurry, or it can be reworded as a state where the precursor particles exist in a dry powder. That is, in this step, it is important to remove the hydrophobic solvent in an environment where the precursor particles come into direct contact with the outside gas.

The method removing the hydrophobic solvent from the precursor particles in a gaseous atmosphere, is not particularly limited, and a known method may be employed. Examples of the method include a reduced pressure drying method, a heat drying method, a flash drying method, and the combination of these methods.

Especially, in the case of using the heat drying method, the heating temperature needs to be set to more than or equal to the boiling point of the hydrophobic solvent and less than or equal to the highest temperature at which the shell structure of the precursor particles does not collapse. Accordingly, depending on the composition of the shell and the type of the hydrophobic solvent in the precursor particles, the heating temperature may be from 50° C. to 200° C., may be from 70° C. to 200° C., or may be from 100° C. to 200° C., for example.

The hydrophobic solvent in the interior of the precursor particles is substituted with the outside gas by the drying operation in the gaseous atmosphere. As a result, be hollow particles in which the hollow portion is occupied by gas, are obtained.

The drying atmosphere is not particularly limited and may be appropriately selected depending on the intended application of the hollow particles. Possible examples of the drying atmosphere include air, oxygen, nitrogen and argon.

Further, by filling the interior of the hollow particles with gas once and then performing reduced pressure drying, hollow particles in which the interior is evacuated are also temporarily obtained.

As another method, the hydrophobic solvent may be removed as follows: the precursor composition obtained in the polymerization step, which is in the form of slurry, is not subjected to solid-liquid separation and, instead, in the slurry containing the precursor particles and the aqueous medium, the hydrophobic solvent included in the precursor particles is substituted with the aqueous medium of the slurry, thereby removing the hydrophobic solvent.

In this method, at a temperature equal to or more than the temperature obtained by subtracting 35° C. from the boiling point of the hydrophobic solvent, an inert gas is bubbled into the precursor composition. Accordingly, the hydrophobic solvent can be removed from the precursor particles.

When the hydrophobic solvent is a mixed solvent containing several kinds of hydrophobic solvents and it has several boiling points, the boiling point of the hydrophobic solvent in the solvent removal step is determined as the boiling point of the solvent having the highest boiling point among the solvents contained in the mixed solvent, that is, the highest boiling point of the several boiling points.

The temperature at the time of bubbling the inert gas into the precursor composition, is preferably a temperature equal to or more than the temperature obtained by subtracting 30° C. from the boiling point of the hydrophobic solvent, and more preferably a temperature equal to or more than the temperature obtained by subtracting 20° C. from the boiling point of the hydrophobic solvent, from the viewpoint of reducing the amount of the residual hydrophobic solvent in the hollow particles. The temperature at the time of bubbling is generally set to a temperature equal to or more than the polymerization temperature of the polymerization step. The temperature at the time of bubbling, is not particularly limited, and it may be 50° C. or more and 100° C. or less.

The inert gas used for the bubbling is not particularly limited. As the inert gas, examples include, but are not limited to, nitrogen and argon.

Depending on the type and amount of the hydrophobic solvent, the bubbling condition is appropriately controlled so that the hydrophobic solvent can be removed from the precursor particles. The bubbling condition is not particularly limited. For example, the inert gas may be bubbled in an amount of 1 L/min to 3 L/min for 1 hour to 10 hours.

By this method, an aqueous slurry is obtained, in which the aqueous medium is included in the precursor particles. The slurry is subjected to solid-liquid separation to obtain hollow particles, and the aqueous medium is removed from the hollow particles, thereby obtaining the hollow particles in which the hollow portion is occupied by gas.

The method for obtaining the hollow particles in which the hollow portion is filled with gas, by subjecting the precursor composition in the form of slurry to solid-liquid separation and then removing the hydrophobic solvent from the precursor particles in the gaseous atmosphere, is compared to the method for obtaining the hollow particles in which the hollow portion is filled with gas, by substituting, in the slurry containing the precursor particles and the aqueous medium, the hydrophobic solvent included in the precursor particles with the aqueous medium of the slurry, subjecting the slurry to solid-liquid separation, and then removing the aqueous medium from the precursor particles in the gaseous atmosphere. As a result, the former method is advantageous in that the hollow particles are less likely to collapse in the hydrophobic solvent removal step, and the latter method is advantageous in that the amount of the residual hydrophobic solvent is decreased by bubbling the inert gas.

Also, a hydrophobic organic solvent included in the precursor particles may be removed therefrom after the polymerization step and before the solid-liquid separation step, without the solid-liquid separation of the slurry precursor composition obtained in the polymerization step, by use of the following method, for example: evaporating the hydrophobic organic solvent included in the precursor particles from the precursor composition at a predetermined pressure (a high, normal or reduced pressure), or evaporating the hydrophobic organic solvent included in the precursor particles from the precursor composition by introducing water vapor or inert gas such as nitrogen, argon and helium to the precursor composition at a predetermined pressure (a high, normal or reduced pressure).

(6) Others

In addition to the steps (1) to (5) mentioned above, the following washing step (6-a) and the following hollow portion re-substitution step (6-b) may be added, for example.

(6-a) Washing Step

The washing step includes carrying out washing by adding acid or alkali, for removal of the dispersion stabilizer remaining in the precursor composition containing the precursor particles before the solvent removal step. When the dispersion stabilizer used is an acid-soluble inorganic dispersion stabilizer, washing is preferably carried out by adding acid to the precursor composition containing the precursor particles. When the dispersion stabilizer used an alkali-soluble inorganic compound, washing is preferably carried out by adding alkali to the precursor composition containing the precursor particles.

When the acid-soluble inorganic dispersion stabilizer is used as the dispersion stabilizer, the pH of the precursor composition is preferably controlled to 6.5 or less, and more preferably 6 or less, by adding acid to the precursor composition containing the precursor particles. As the added acid, an inorganic acid such as sulfuric acid, hydrochloric acid and nitric acid or an organic acid such as formic acid and acetic acid may be used. Of them, sulfuric acid is particularly preferred, due to its high dispersion stabilizer removal efficiency and small influence on production equipment.

(6-b) Hollow Portion Re-Substitution Step

The hollow portion re-substitution step includes resubstituting the gas or liquid in the interior of the hollow particles with another gas or liquid. By such substitution, the environment of the interior of the hollow particles can be changed; molecules can be selectively confined in the interior of the hollow particles; or the chemical structure of the interior of the hollow particles can be modified in accordance with the intended application thereof.

2. Hollow Particles

The hollow particles of the present disclosure are hollow particles which comprise a shell containing a resin and a hollow portion surrounded by the shell and which have a void ratio of 50% or more, wherein the volume average particle diameter is 10 μm or more and 50 μm or less;

wherein the ratio of the actually measured shell thickness to the theoretical shell thickness (actually measured shell thickness/theoretical shell thickness) is 0.80 or more and 1.00 or less; and wherein the theoretical shell thickness is a value obtained by calculating the inner diameter r of the hollow particles by the following formula (1) using the volume average particle diameter R and void ratio of the hollow particles, and calculating the theoretical shell thickness by the following formula (2) using the inner diameter r and the volume average particle diameter R:

$$4/3\pi \times (R/2)^3 \times (\text{Void ratio}/100) = 4/3\pi \times (r/2)^3 \qquad \text{Formula (1)}$$

$$\text{Theoretical shell thickness} = (R-r)/2 \qquad \text{Formula (2)}.$$

The void ratio in the formula (1) is a figure expressed in percentage.

The hollow particles of the present disclosure are obtained by the above-mentioned production method of the present disclosure.

It has been difficult to impart a uniform thickness to the shell of the hollow particles having a volume average particle diameter of 10 μm or more. In the hollow particles of the present disclosure, while the volume average particle diameter is 10 μm or more and 50 μm or less, the ratio of the actually measured shell thickness to the theoretical shell thickness (actually measured shell thickness/theoretical shell thickness) is 0.80 or more and 1.00 or less, and the shell thickness non-uniformity is small. As the ratio (actually measured shell thickness/theoretical shell thickness) comes close to 1.00, the uniformity of the shell thickness increases. In accordance with a preferred embodiment of the production method of the present disclosure, the ratio (actually measured shell thickness/theoretical shell thickness) can be 0.85 or more and 1.00 or less. In accordance with a more preferred embodiment of the production method of the present disclosure, the ratio (actually measured shell thickness/theoretical shell thickness) can be 0.90 or more and 1.00 or less.

Both the theoretical shell thickness and actually measured shell thickness of the hollow particles of the present disclosure are preferably from 0.5 μm to 4 μm, more preferably from 0.6 μm to 3 μm, and still more preferably from 0.7 μm to 2 μm. When the thickness of the shell of the hollow particles is equal to or more than the lower limit value, the strength of the shell increases, and the pressure resistance of the hollow particles increases. When the thickness of the shell of the hollow particles is equal to or less than the upper limit value, the void ratio of the hollow particles increases.

In the present disclosure, the actually measured shell thickness is the average of shell thicknesses actually measured for 10 hollow particles. The thickness of the shell of each hollow particle can be measured by SEM observation of shell fragments obtained by breaking the hollow particle. The thickness of the shell of each hollow particle may be the shell thickness at any one point.

The volume average particle diameter of the hollow particles of the present disclosure is 10 μm or more and 50 μm or less. When the volume average particle diameter of the hollow particles is equal to or more than the lower limit value, the effect of suppressing the shell thickness non-uniformity is easily exerted by the production method of the present disclosure. Also when the volume average particle diameter of the hollow particles is equal to or more than the lower limit value, the hollow particles exert excellent pressure resistance ever if the void ratio is high. Also when the volume average particle diameter of the hollow particles is equal to or more than the lower limit value, the aggregability of the hollow particles decreases, and the hollow particles exert excellent dispersibility, accordingly. When the volume average particle diameter of the hollow particles is equal to or less than the upper limit value, hollow particles having small shell thickness non-uniformity are obtained.

The lower limit of the volume average particle diameter of the hollow particles of the present disclosure is preferably 13 μm or more, and more preferably 15 μm or more, from the point of view that the effect of suppressing the shell thickness non-uniformity is easily exerted, and the effect of increasing the pressure resistance by suppressing the shell thickness non-uniformity is easily exerted. The upper limit of the volume average particle diameter of the hollow particles of the present disclosure is preferably 40 μm or less, and more preferably 30 μm or less, from the viewpoint of suppressing the shell thickness non-uniformity.

To control the volume average particle diameter of the hollow particles within the above-mentioned preferred range, for example, it is preferable to use the combination of the above-mentioned preferred dispersion stabilizer and particle diameter control agent in the mixture liquid preparation step, and it is also preferable to use the above-mentioned preferred hydrophobic solvent.

The shape of the hollow particles of the present disclosure is not particularly limited, as long as the hollow portion is formed in the interior. As the shape, examples include, but are not limited to, a spherical shape, an ellipsoidal shape and an irregular shape. Among them, a spherical shape is preferable in terms of ease of production.

The hollow particles of the present disclosure may have one or two or more hollow portions. From the viewpoint of maintaining good balance between high void ratio and mechanical strength and from the viewpoint of suppressing the shell thickness non-uniformity, the hollow particles preferably have only one hollow portion. The shell of the hollow particles of the present disclosure and, when the hollow particles have two or more hollow portions, a partition separating the adjacent hollow portions from each other may be porous. From the viewpoint of suppressing the shell thickness non-uniformity, the shell and the partition are preferably solid.

The average circularity of the hollow particles of the present disclosure may be from 0.950 to 0.995.

An example of the image of the shape of the hollow particles of the present disclosure, is a bag made of a thin film and inflated with gas. A cross-section of the bag is like the hollow particle 100 shown in the diagram (5) of FIG. 1. In this example, one thin film is provided on the outside, and the interior is filled with gas.

The shape of the particles can be determined by SEM or TEM, for example. Further, the shape of be interior of the particles and the presence of the fine resin particles in the interior of the particles can be determined by SEM or TEM after cutting the particles into round slices by a known method.

The particle size distribution (volume average particle diameter (Dv)/number average particle diameter (Dn)) of the hollow particles may be 1.1 or more and 2.5 or less, for example. When the particle size distribution is 2.5 or less, hollow particles such that compressive strength and heat resistance slightly vary between the hollow particles, can be obtained. When the particle size distribution is 2.5 or less, a product having uniform thickness can be produced in the case of producing a molded body in a sheet form, for example.

The volume average particle diameter (Dv) and number average particle diameter (Dn) of the hollow particles can be found as follows, for example. The particle diameter of each of the hollow particles is measured with a particle size distribution measuring apparatus; the number average and volume average of the particle diameters are calculated; and the obtained values can be used as the number average particle diameter (Dn) and volume average particle diameter (Dv) of the hollow particles. The particle size distribution is found by dividing the volume average particle diameter by the number average particle diameter.

The void ratio of the hollow particles of the present disclosure is 50% or more, preferably 60% or more, more preferably 70% or more, and still more preferably 75% or more. When the void ratio is equal to or more than the lower limit value, the hollow particles obtain excellent lightness in weight, excellent heat resistance and excellent heat insulating properties, and the shell thickness non-uniformity is easily suppressed. The upper limit of the void ratio of the hollow particles of the present disclosure is not particularly limited. From the viewpoint of suppressing a decrease in the strength of the hollow particles and making the hollow particles less likely to collapse, the upper limit is preferably 90% or less, more preferably 85% or less, and still more preferably 80% or less.

The void ratio of the hollow particles of the present disclosure is calculated from the addition amount and specific gravity of the material for forming the shell used in the production of the hollow particles, and the addition amount and specific gravity of the hydrophobic solvent. The material for forming the shell is the solid component (solid material) obtained by excluding the hydrophobic solvent from the materials for the oil phase in the mixture liquid prepared in the mixture liquid preparation step. The hydrophobic solvent is the hydrophobic solvent of the mixture liquid.

When the content of the polymerizable monomer is 99% by mass or more with respect to 100% by mass of the material for forming the shell, the shell can be considered to be composed of the polymer of the polymerizable monomer. Accordingly, the void ratio of the hollow particles can be calculated by the following formula (C):

Void ratio (%)=100−[(Addition amount of the polymerizable monomer/Specific gravity of the polymerizable monomer)/{(Addition amount of the polymerizable monomer/Specific gravity of the polymerizable monomer)+(Addition amount of the hydrophobic solvent/Specific gravity of the hydrophobic solvent)}]    Formula (C).

When the mixture liquid contains several kinds of polymerizable monomers, the "Addition amount of the polymerizable monomer/Specific gravity of the polymerizable monomer" in the formula (C) is the sum of the results of calculating the "Addition amount of the polymerizable monomer/Specific gravity of the polymerizable monomer" for the polymerizable monomers. When the mixture liquid contains several kinds of hydrophobic solvents, "Addition amount of the hydrophobic solvent/Specific gravity of the hydrophobic solvent" in the formula (C) is the sum of the results of calculating the "Addition amount of the hydrophobic solvent/Specific gravity of the hydrophobic solvent" for the hydrophobic solvents.

Also, the void ratio of the hollow particles of the present disclosure can be calculated from the apparent density $D_1$ and true density $D_0$ of the hollow particles.

A method for measuring the apparent density $D_1$ of the hollow particles is as follows. First, approximately 30 cm$^3$ of the hollow particles are introduced into a measuring flask with a volume of 100 cm$^3$, and the mass of the introduced hollow particles is precisely weighed. Next, the measuring flask ire which the hollow particles are introduced, is precisely filled with isopropanol up to the marked line while care is taken so that air bubbles do not get in. The mass of the isopropanol added to the measuring flask is precisely weighed, and the apparent density $D_1$ (g/cm³) of the hollow particles is calculated by the following formula (I).

Apparent density $D_1$=[Mass of the hollow particles]/(100−[Mass of the isopropanol]/[Specific gravity of the isopropanol at the measuring temperature])    Formula (1)

The apparent density $D_1$ is equivalent to the specific gravity of the whole hollow particle in the case where the hollow portion is regarded as a part of the hollow particle.

A method for measuring the true density $D_0$ of the hollow particles is as follows. The hollow particles are pulverized in advance; approximately 10 g of the pulverized hallow particles are introduced into a measuring flask with a volume of 100 cm³; and the mass of the introduced pulverized particles is precisely weighed. After that, similarly to the measurement of the apparent density mentioned above, isopropanol is added to the measuring flask; the mass of the isopropanol is precisely weighed; and the true density $D_0$ (g/cm³) of the hollow particles is calculated by the following formula (II).

True density $D_0$=[Mass of the pulverized hollow particles]/(100−[Mass of the isopropanol]/[Specific gravity of the isopropanol at the measuring temperature])    Formula (II)

The true density $D_0$ is equivalent to the specific gravity of the shell portion alone of the hollow particle. As is clear from the measurement method mentioned above, when calculating the true density $D_0$, the hollow portion is not regarded as a part of the hollow particle.

The void ratio of the hollow particles calculated by the following formula (III) where $D_1$ is the apparent density of the hollow particles and $D_0$ is the true density thereof.

Void ratio(%)=100−(Apparent density $D_1$/True density $D_0$)×100    Formula (III)

The void ratio of the hollow particle can be reworded as the ratio occupied by the hollow portion in the specific gravity of the hollow particle.

The hollow particles of the present disclosure obtained by the above-mentioned production method of the present disclosure, are particles in which the production of fine resin particles having a very small particle diameter compared to the hollow particles, is suppressed. Accordingly, in the hollow particles of the present disclosure obtained by the above-mentioned production method of the present disclosure, the number of the fine resin particles present in the hollow portion can be controlled to 3/hollow particle or less. The number of the fine resin particles present in the hollow portion of the hollow particles of the present disclosure can be controlled to 1/hollow particle or less in accordance with a preferred embodiment, and it can be controlled to 0/hollow particle in accordance with a more preferred embodiment.

The particle diameter of the fine resin particles is generally from about 0.01 µm to 1 µm, which is equal to or less than one-tenth of the particle diameter of the hollow particles.

The hollow particles of the present disclosure have excellent strength, since the shell contains a sufficient amount of the crosslinkable monomer unit. Also, the hollow particles of the present disclosure excel in shell thickness uniformity, even when the volume average particle diameter is 10 µm or more. The hollow particles having a volume average particle diameter of 10 µm or more easily exerts excellent pressure resistance, when the shell thickness is uniform. Due to the excellent strength and pressure resistance, the hollow particles of the present disclosure are less likely to collapse when mixed and kneaded with other materials and even when molded after mixing and kneading with other materials. When they are added to a molded body, they exert excellent effects as a weight reducing material, a heat insulation material, an acoustic insulation material, a damping material and so on. Accordingly, the hollow particles of the present disclosure are particularly suitable as an additive for molded body. The hollow particles of the present disclosure are less likely to collapse even when kneaded with a resin and even when molded into a molded body after kneading with a resin. Accordingly, the hollow particles are particularly suitably used as an additive for molded body made of resin.

The molded body containing the hollow particles of the present disclosure may contain, as the resin, thermoplastic or thermosetting resin such as polyethylene, polypropylene, polyvinyl chloride, polystyrene, polyurethane, epoxy resin, acrylonitrile-butadiene-styrene (ABS) resin, acrylonitrile-styrene (AS) resin, poly(meth)acrylate, polycarbonate polyamide, polyimide, polyphenylene ether, polyphenylene sulfide, polyester, polytetrafluoroethylene, maleimide resin, bismaleimide triazine resin, liquid crystalline polyester resin, phenolic resin, vinyl ester resin, unsaturated polyester resin, cyanate ester resin, polyetherketoneketone resin and polyetherimide resin. When epoxy resin is used as the resin component, it is preferable to appropriately mix the resin with a catalyst or a curing agent such as an amine, an acid anhydride and an imidazole.

The molded body containing the hollow particles of the present disclosure may contain a thermoplastic elastomer as the resin. As the thermoplastic elastomer, a thermoplastic elastic polymer that is conventionally used as a molding resin, may be used, such as urethane-based elastomer, styrene-based elastomer, olefin-based elastomer, amide-based elastomer and ester-based elastomer. The thermoplastic elastomer is an elastomer having the following properties: it shows rubber elasticity at ordinary temperature (25° C.) and it can be plasticized and molded at high temperature.

Also, the molded body containing the hollow particles of the present disclosure is not limited to a resin molded body. For example, it may be a rubber molded body or a molded body containing a mixture of a resin and a rubber. The molded body containing the hollow particles of the present disclosure may contain a rubber such as a natural rubber (NR), an isoprene rubber (IR), a butadiene rubber (BR), a styrene-butadiene copolymer rubber (SBR), an acrylonitrile-butadiene copolymer rubber (NBR) and an ethylene-propylene-diene terpolymer (EPDM). These rubbers may be used alone or in combination of two or more.

The molded body containing the hollow particles of the present disclosure may further contain organic or inorganic fibers such as carbon fibers, glass fibers, aramid fibers and polyethylene fibers. The hollow particles of the present disclosure can be contained as a filler in a molded body formed by use of a rubber or a thermoplastic or thermosetting resin and in a molded body formed by use of a material containing fibers and a rubber or a thermoplastic or thermosetting resin.

As the applications of the molded body made of a resin or rubber containing the hollow particles of the present disclosure, examples include, but are not limited to, members such as a light reflective material, a heat insulation material, a sound insulation material and a low dielectric material, which are used in various kinds of fields such as the automotive field, the electronic field, the electric field, the architecture field, the aviation field and the space field; food containers; foo wears such as sports shoes and sandals;

components of household appliances; components of bicycles; stationery supplies; and tools.

The hollow particles of the present disclosure, which have a volume average particle diameter of from 10 to 50 μm, especially excel in pressure resistance. Accordingly, they can be suitably used as an additive for molded bodies that are obtained through a process in which external pressure is applied, such as mixing, kneading and injection molding.

The hollow particles of the present disclosure have a high void ratio, are less likely to collapse, and have high heat resistance. Accordingly, the hollow particles have heat insulation properties and shock-absorbing properties (cushioning properties) required of an under-coating material, and they also have heat resistance line with thermal paper uses. Further, the hollow particles of the present disclosure are useful as a plastic pigment that is excellent in gloss, hiding power, etc.

A useful component such as a perfume, a medicine, an agricultural chemical and an ink component can be enclosed in the interior of the hollow particles of the present disclosure by a means such as immersion treatment or depressurized or pressurized immersion treatment. Accordingly, the hollow particles in which such a useful component is enclosed, can be used for various applications in accordance with the component contained in the interior.

EXAMPLES

Hereinbelow, be present disclosure is described more specifically using examples and comparative examples. However, the present disclosure is not limited to these examples. Also, "part(s)" and "%" are on a mass basis unless otherwise specified.

Example 1

(1) Mixture Liquid Preparation Step

First, the following materials were mixed to produce an oil phase.

Polymerizable monomer: Ethylene glycol dimethacrylate (26.2 parts)

2,2'-Azobis(2,4-dimethylvaleronitrile) (an oil-soluble polymerization initiator manufactured by: Wako Pure Chemical Industries, Ltd., product name: V-65): 0.61 parts Rosin acid (manufactured by: Arakawa Chemical Industries, Ltd., product name: disproportionated rosin RONDIS R-CH, softening point: 150° C. or more, acid value: 150 mgKOH/g to 160 mgKOH/g): 0.002 parts Hydrophobic solvent: Cyclohexane (36.7 parts) and toluene (36.7 parts)

Next, in a stirring tank, under a temperature condition of 80° C., an aqueous solution in which 5.5 parts of sodium hydroxide (an alkali metal hydroxide) was dissolved in 55 parts of ion-exchanged water, was gradually added under stirring to an aqueous solution in which 7.8 parts of magnesium chloride (a water-soluble polyvalent metal salt) was dissolved in 225 parts of ion-exchanged water, thereby preparing a magnesium hydroxide colloidal dispersion (a sparingly water-soluble metal hydroxide colloidal dispersion). The obtained dispersion was cooled to 40° C., and the cooled dispersion was used as an aqueous phase.

The obtained aqueous phase and oil phase were mixed, thereby preparing a mixture liquid.

(2) Suspension Step

The mixture liquid obtained in the mixture liquid preparation step was stirred with a disperser (product name: HOME) MIXER, manufactured by: PRIMIX Corporation) for one minute at a rotational frequency of 4,000 rpm to be suspended, thereby preparing a suspension in which droplets of a monomer composition including the hydrophobic solvent, were dispersed in water.

(3) Polymerization Step

In a nitrogen atmosphere, the temperature of the suspension obtained in the suspension step was increased from 40° C. to 65° C. for one and a half hours, and then the suspension was stirred for 4 hours under a temperature condition of 65° C., thereby performing a polymerization reaction. Accordingly, precursor composition was obtained, which was a slurry solution in which precursor particles including the hydrophobic solvent were dispersed in water.

(4) Washing Step and Solid-Liquid Separation Step

The precursor composition obtained in the polymerization step was washed with dilute sulfuric acid (25° C., 10 minutes) to bring the pH of the composition to 5.5 or less. Next, water was separated therefrom by filtration. Then, 200 parts of ion-exchanged water was added to the resultant to make a slurry again, and a water washing treatment (washing, filtration and dehydration) was repeatedly performed several times at room temperature (25° C.) The resultant was separated by filtration, thereby obtaining a solid component. The obtained solid component was dried with a dryer at a temperature of 40° C., thereby obtaining the precursor particles including the hydrophobic solvent.

(5) Solvent Removal Step

The precursor particles obtained in the solid-liquid separation step were subjected to heating treatment for 6 hours with a vacuum dryer in a vacuum condition at 200° C., thereby removing the hydrophobic solvent from the particles. Accordingly, the hollow particles of Example 1 were obtained. From the scanning electron microscopy observation result and void ratio value of the obtained hollow particles, the particles were confirmed to be spherical and to have a hollow portion.

Examples 2 to 8 and Comparative Examples 1 to 6

The hollow particles of Examples 2 to 8 and Comparative Examples 1 to 6 were produced in the same manner as Example 1, except that in the above-mentioned "(1) Mixture liquid preparation step", the materials of the oil phase and their addition amounts were changed as shown in Table 1, and the temperature in the preparation of the magnesium hydroxide colloidal dispersion was changed from 80° C. to 60° C.

Evaluation

1. HSP Distance Between Crosslinkable Monomer and Hydrophobic Solvent

Using the calculation software named Hansen Solubility Parameter in Practice (HSPiP) (version 5.3.03), the dispersion term dD, polarity term dP and hydrogen bonding term dH of the crosslinkable monomer and hydrophobic solvent used in Examples 1 to 8 and Comparative Examples 1 to 6 were obtained. Using HSPiP, the HSP distance between the crosslinkable monomer and the hydrophobic solvent was calculated by the following formula (A). Also, the total HSP of the crosslinkable monomer and that of the hydrophobic solvent were calculated the following formula (B) The calculation results are shown in Table 1.

$$\text{HSP distance} = \{4(dD_1-dD_2)^2+(dP_1-dP_2)^2+(dH_1-dH_2)^2\}^{0.5} \quad \text{Formula (A)}$$

$$\text{Total HSP} = (dD^2+dP^2+dH^2)^{0.5} \quad \text{Formula (B)}$$

The dD, dP and dH of the crosslinkable monomer and those of the hydrophobic solvent were obtained use of the values stored in the database of HSPiP. The dD, dP and dH of the substances not stored in the database were obtained by use of HSPiP, based on the chemical structures of the substances.

When the crosslinkable monomer or the hydrophobic solvent is a mixture, based on the dD, dP and dH of the substances contained in the mixture and the ratio of the substances, the weighted averages thereof were calculated and used as the dispersion dD, polarity dP and hydrogen bonding dH of the mixture.

The hollow particles obtained in Examples 1 to 8 and Comparative Examples 1 to 6 were measured and evaluated as follows. The results are shown in Table 1.

2. Volume Average Particle Diameter of Hollow Particles

The volume average particle diameter of the hollow particles was measured with a article size distribution measuring device (product name: MULTISIZER 4e, manufactured by: Beckman Coulter, Inc.) The measurement condition is as follows.

Aperture diameter: 280 μm
Dispersion medium: ISOTON II (product name)
Concentration: 10%
Number of the measured hollow particles: 100,000 particles More specifically, 0.2 g of the sample hollow particles were put in a beaker. As a dispersant, a surfactant aqueous solution (product name: DRIWEL, manufactured by: Fujifilm Corporation) was added thereto. In addition, 2 mL of the dispersion medium was added to wet the hollow particles. Then, 10 mL of the dispersion medium was added thereto. The mixture was dispersed for one minute with an ultrasonic disperser. Then, the measurement with the above-described particle size measuring device was carried out.

3. Void Ratio of Hollow Particles

From the addition amount and specific gravity of the polymerizable monomer and hydrophobic solvent added to the oil phase in the mixture liquid preparation step, the void ratio of the hollow particles was calculated by the following formula (C):

Void ratio(%)=100−[(Addition amount of the polymerizable monomer/Specific gravity of the polymerizable monomer)/{(Addition amount of the polymerizable monomer/Specific gravity of the polymerizable monomer)+(Addition amount of the hydrophobic solvent/Specific gravity of the hydrophobic solvent)}]  Formula (C).

4. Theoretical Shell Thickness of Hollow Particles

The theoretical shell thickness of the hollow particles was obtained by calculating the inner diameter r of the hollow particles by the following formula (1) using the volume average particle diameter R and void ratio of the hollow particles, and calculating the theoretical shell thickness by the following formula (2) using the inner diameter r and the volume average particle diameter R:

$$4/3\pi \times (R/2)^3 \times (\text{Void ratio}/100) = 4/3\pi \times (r/2)^3 \quad \text{Formula (1)}$$

$$\text{Theoretical shell thickness} = (R-r)/2 \quad \text{Formula (2)}.$$

5. Actually Measured Shell Thickness of Hollow Particles

The hollow particles were broken by use of a spatula, and the thickness of the shell was measured by use of a scanning electron microscope (manufactured by: JEOL Ltd., product name: JSM7610F). Of the hollow particles, 10 hollow particles were measured for shell thickness, and the average of the measured shell thicknesses was determined as the actually measured shell thickness.

6. Internal State of Hollow Particles

The hollow particles were broken by use of a spatula, and the internal state of the hollow particles was observed with the scanning electron microscope (manufactured by: JEOL Ltd., product name: JSM7610F). When the number of the fie resin particles present in the hollow portion was 0/hollow particle and the fine resin particles were not found in the interior of the hollow particles, the internal state of the hollow particles was evaluated as "Fine resin particles not present". When be number of the fine resin particles present in the hollow portion was 1/hollow particle or more and the fine resin particle or particles were found in the interior of the hollow particles, the internal state of the hollow particles was evaluated as "Fine resin particles present". When the hollow portion was not formed in the interior of the hollow particles and the whole interior of the hollow particles was porous, the internal state of the hollow particles was evaluated as "Porous".

TABLE 1

| | | | Example 1 | Example 2 | Example 3 | Example 4 | Example 5 |
|---|---|---|---|---|---|---|---|
| Polymerizable monomer (Parts by mass) | Crosslinkable monomer | EGDMA | 26.2 | 26.2 | 26.2 | 26.2 | 23.58 |
| | | A-TMMT | — | — | — | — | 2.62 |
| | | TMPTA | — | — | — | — | — |
| | Non-crosslinkable monomer | MAA | | | | | |
| Polymerizable monomer content (in 100 parts by mass of polymerizable monomer) | Crosslinkable monomer | EGDMA | 100 | 100 | 100 | 100 | 90 |
| | | A-TMMT | — | — | — | — | 10 |
| | | TMPTA | — | — | — | — | — |
| | Non-crosslinkable monomer | MAA | | | | | |
| Hydrophobic solvent (Parts by mass) | | Cyclohexane | 36.7 | 51.38 | 36.7 | 29.36 | 36.7 |
| | | Toluene | 36.7 | 22.02 | 36.7 | 44.04 | 36.7 |
| | | Ethyl acetate | — | — | — | — | — |
| | | Hexane | — | — | — | — | — |
| Hydrophobic solvent content (in 100 parts by mass of hydrophobic solvent) | | Cyclohexane | 50 | 70 | 50 | 40 | 50 |
| | | Toluene | 50 | 30 | 50 | 60 | 50 |
| | | Ethyl acetate | — | — | — | — | — |
| | | Hexane | — | — | — | — | — |

TABLE 1-continued

| | | | | | | | |
|---|---|---|---|---|---|---|---|
| Polymerization initiator (Parts by mass) | V65 | | 0.61 | 0.61 | 0.61 | 0.61 | 0.61 |
| Additive (Parts by mass) | Rosin acid | | 0.002 | 0.002 | 0.002 | 0.002 | 0.002 |
| HSP distance between crosslinkable monomer and hydrophobic solvent | | | 6.04 | 6.40 | 6.04 | 5.91 | 6.00 |
| Total HSP ($MPa^{1/2}$) of crosslinkable monomer | | | 17.80 | 17.80 | 17.80 | 17.80 | 17.90 |
| Total HSP ($MPa^{1/2}$) of hydrophobic solvent | | | 17.40 | 17.20 | 17.40 | 17.60 | 17.40 |
| Volume average particle diameter (μm) | | | 49.1 | 24.0 | 24.9 | 21.5 | 24.5 |
| Void ratio (%) | | | 78 | 79 | 78 | 78 | 78 |
| Theoretical shell thickness (μm) | | | 1.93 | 0.93 | 0.98 | 0.85 | 0.96 |
| Actually measured shell thickness (μm) | | | 1.77 | 0.82 | 0.88 | 0.82 | 0.96 |
| Actually measured shell thickness/ Theoretical shell thickness | | | 0.92 | 0.88 | 0.90 | 0.96 | 1.00 |
| Internal state of hollow particles | | | Fine resin particles not present | Fine resin particles not present | Fine resin particles not present | Fine resin particles not present | Fine resin particles not present |

| | | | Example 6 | Example 7 | Example 8 | Comparative Example 1 | Comparative Example 2 |
|---|---|---|---|---|---|---|---|
| Polymerizable monomer (Parts by mass) | Crosslinkable monomer | EGDMA | 20.96 | 18.34 | 26.2 | 26.2 | 26.2 |
| | | A-TMMT | 5.24 | 7.86 | — | — | — |
| | | TMPTA | — | — | — | — | — |
| | Non-crosslinkable monomer | MAA | | | | | |
| Polymerizable monomer content (in 100 parts by mass of polymerizable monomer) | Crosslinkable monomer | EGDMA | 80 | 70 | 100 | 100 | 100 |
| | | A-TMMT | 20 | 30 | — | — | — |
| | | TMPTA | — | — | — | — | — |
| | Non-crosslinkable monomer | MAA | | | | | |
| Hydrophobic solvent (Parts by mass) | Cyclohexane | | 36.7 | 36.7 | 66.06 | 73.4 | 66.06 |
| | Toluene | | 36.7 | 36.7 | — | — | 7.34 |
| | Ethyl acetate | | — | — | 7.34 | — | — |
| | Hexane | | — | — | — | — | — |
| Hydrophobic solvent content (in 100 parts by mass of hydrophobic solvent) | Cyclohexane | | 50 | 50 | 90 | 100 | 90 |
| | Toluene | | 50 | 50 | — | — | 10 |
| | Ethyl acetate | | — | — | 10 | — | — |
| | Hexane | | — | — | — | — | — |
| Polymerization initiator (Parts by mass) | V65 | | 0.61 | 0.61 | 0.61 | 0.61 | 0.61 |
| Additive (Parts by mass) | Rosin acid | | 0.002 | 0.002 | 0.002 | 0.002 | 0.002 |
| HSP distance between crosslinkable monomer and hydrophobic solvent | | | 5.97 | 5.97 | 6.01 | 6.89 | 6.70 |
| Total HSP ($MPa^{1/2}$) of crosslinkable monomer | | | 17.90 | 17.90 | 17.80 | 17.80 | 17.80 |
| Total HSP ($MPa^{1/2}$) of hydrophobic solvent | | | 17.40 | 17.40 | 16.70 | 16.80 | 16.90 |
| Volume average particle diameter (μm) | | | 26.4 | 21.7 | 22.0 | 22.0 | 33.5 |
| Void ratio (%) | | | 78 | 78 | 79 | 79 | 79 |
| Theoretical shell thickness (μm) | | | 1.04 | 0.85 | 0.84 | 0.83 | 1.27 |
| Actually measured shell thickness (μm) | | | 0.95 | 0.84 | 0.82 | 0.40 | 0.40 |
| Actually measured shell thickness/ Theoretical shell thickness | | | 0.92 | 0.98 | 0.98 | 0.48 | 0.31 |
| Internal state of hollow particles | | | Fine resin particles not present | Fine resin particles not present | Fine resin particles not present | Fine resin particles present | Fine resin particles present |

| | | | Comparative Example 3 | Comparative Example 4 | Comparative Example 5 | Comparative Example 6 |
|---|---|---|---|---|---|---|
| Polymerizable monomer (Parts by mass) | Crosslinkable monomer | EGDMA | 26.2 | 26.2 | 26.2 | — |
| | | A-TMMT | — | — | — | — |
| | | TMPTA | — | — | — | 19 |
| | Non-crosslinkable monomer | MAA | | | | 1 |
| Polymerizable monomer content (in 100 parts by mass of polymerizable monomer) | Crosslinkable monomer | EGDMA | 100 | 100 | 100 | — |
| | | A-TMMT | — | — | — | — |
| | | TMPTA | — | — | — | 95 |
| | Non-crosslinkable monomer | MAA | | | | 5 |

TABLE 1-continued

| | | | | | |
|---|---|---|---|---|---|
| Hydrophobic solvent (Parts by mass) | Cyclohexane | 62.39 | 14.7 | — | — |
| | Toluene | 11.01 | 58.7 | 73.4 | 56 |
| | Ethyl acetate | — | — | — | — |
| | Hexane | — | — | — | 24 |
| Hydrophobic solvent content (in 100 parts by mass of hydrophobic solvent) | Cyclohexane | 85 | 20 | — | — |
| | Toluene | 15 | 80 | 100 | 70 |
| | Ethyl acetate | — | — | — | — |
| | Hexane | — | — | — | 30 |
| Polymerization initiator (Parts by mass) | V65 | 0.61 | 0.61 | 0.61 | 0.61 |
| Additive (Parts by mass) | Rosin acid | 0.002 | 0.002 | 0.002 | 0.002 |
| HSP distance between crosslinkable monomer and hydrophobic solvent | | 6.59 | 5.78 | 5.57 | 3.14 |
| Total HSP (MPa$^{1/2}$) of crosslinkable monomer | | 17.80 | 17.80 | 17.80 | 17.00 |
| Total HSP (MPa$^{1/2}$) of hydrophobic solvent | | 17.00 | 17.90 | 18.20 | 17.20 |
| Volume average particle diameter (μm) | | 25.0 | 23.0 | 19.6 | 16.0 |
| Void ratio (%) | | 79 | 78 | 77 | 85 |
| Theoretical shell thickness (μm) | | 0.95 | 0.93 | 0.81 | 0.42 |
| Actually measured shell thickness (μm) | | 0.62 | Unmeasurable | Unmeasurable | Unmeasurable |
| Actually measured shell thickness/ Theoretical shell thickness | | 0.65 | 0.00 | 0.00 | 0.00 |
| Internal state of hollow particles | | Fine resin particles present | Porous | Porous | Porous |

The meanings of abbreviations shown in Table 1 are as follows.

EGDMA: Ethylene glycol dimethacrylate
A-TMMT: Pentaerythritol tetraacrylate
TMPTA: Trimethylolpropane triacrylate
MAA: Methacrylic acid
V65: 2,2'-Azobis(2,4-dimethylvaleronitrile) (an oil-soluble polymerization initiator manufactured by Wako Pure Chemical Industries, Ltd., product name: V-65)

Consideration

Figure 4:
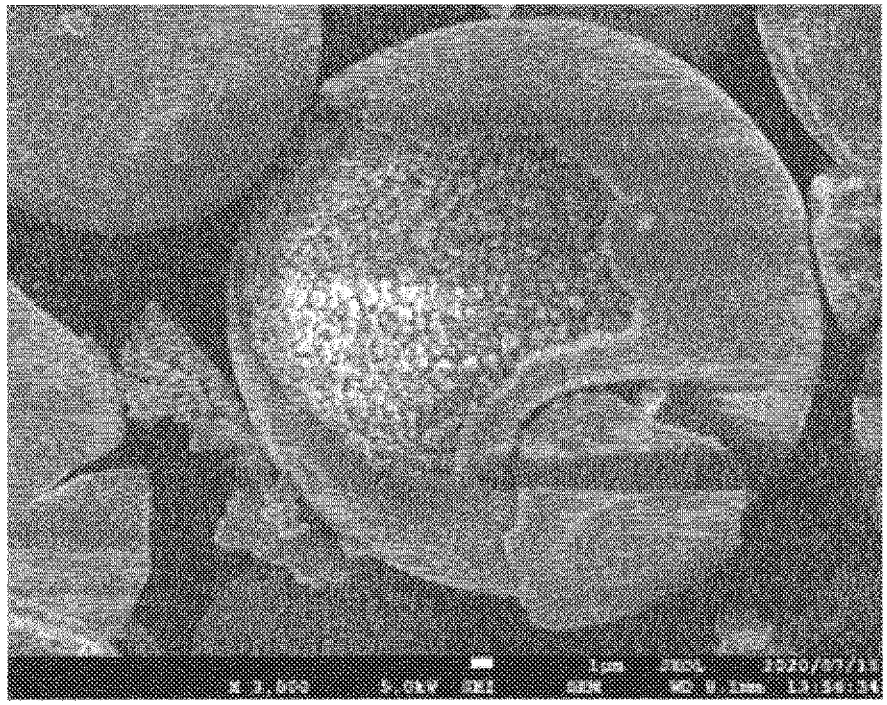
FIG. 4 is a SEM image of the observed internal state of particles obtained in Comparative Example 1.

In Comparative Examples 1 to 3, hollow particles having a hollow portion, a void ratio of 79%, and a volume average particle diameter of from 22.0 μm to 33.5 μm were obtained. However, since the HSP distance between the crosslinkable monomer and hydrophobic solvent used was more than 6.50, the value of "actually measured shell thickness/theoretical shell thickness" was less than 0.80; the shell thickness non-uniformity of the hollow particles was large; and many fine resin particles were present in the hollow portion. FIG. 4 shows a SEM image of the observed internal state of the hollow particles obtained in Comparative Example 1. As is clear from the SEM image of FIG. 4, the shell thickness non-uniformity of the obtained hollow particles was large, and many fine resin particles were present in the interior of the hollow particles. The SEM image of the observed internal state of the hollow particles obtained in Comparative Example 2 and that of the hollow particles obtained in Comparative Example 3 are not shown here; however, they were similar to the SEM image of FIG. 4. In Comparative Examples 1 to 3, it is presumed that since the compatibility between the crosslinkable monomer and the hydrophobic solvent was too low, fast polymer deposition was caused after the initiation of the polymerization reaction; therefore, the shell was non-uniformly formed and resulted in large shell thickness non-uniformity; the polymer was deposited in the form of fine particles in the interior of the hollow portion; and many fine resin particles were produced.

Figure 5:
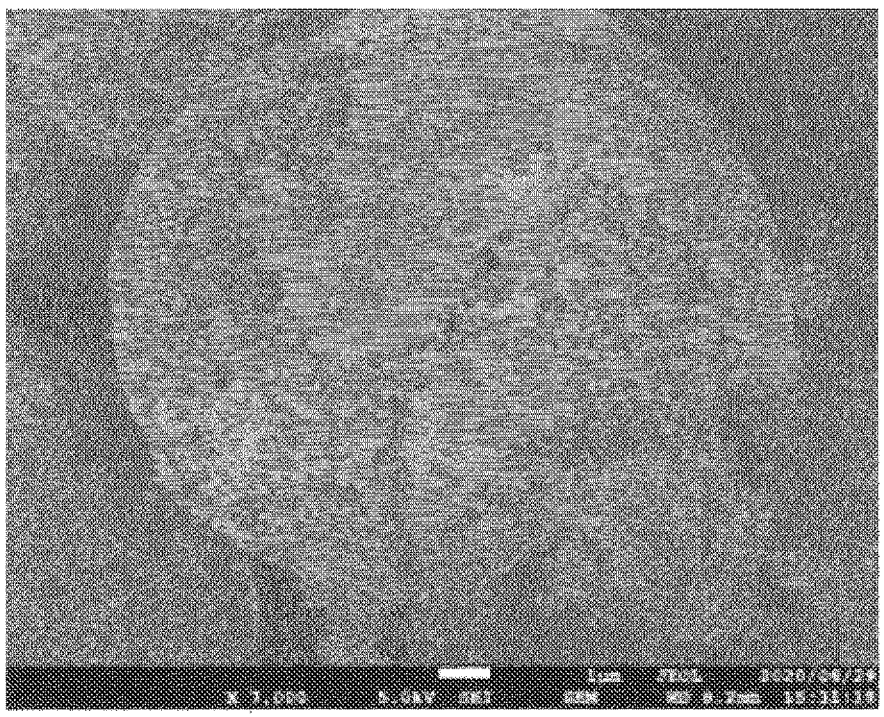
FIG. 5 is SEM image of the observed internal state of particles obtained in Comparative Example 4.

In Comparative Examples 4 to 6, particles having a void ratio of from 77% to 85% and a volume average particle diameter of from 16.0 μm to 23.0 μm were obtained. However, since the HSP distance between the crosslinkable monomer and hydrophobic solvent used was less than 5.80, the whole interior of the obtained particles was porous, and a hollow portion that is clearly distinguished from the shell was not formed. FIG. 5 shows a SEM image of the observed internal state of the particles obtained in Comparative Example 4. As is clear from the SEM image of FIG. 5, the whole interior of the obtained particles was porous. The SEM image of the observed internal state of the particles obtained in Comparative Example 5 and that of the particles obtained in Comparative Example 6 are not shown here; however, they were similar to the SEM image of FIG. 5. In Comparative Examples 4 to 6, it is presumed that since the compatibility between the crosslinkable monomer and the hydrophobic solvent was too high, sufficient phase separation did not occur between the polymerizable monomer and the hydrophobic solvent in the droplets of the monomer composition, and the porous particles were produced. In Comparative Example 6, the same combination of the polymerizable monomer and the hydrophobic solvent as Example of Patent Literature 1 was, used.

Figure 3:
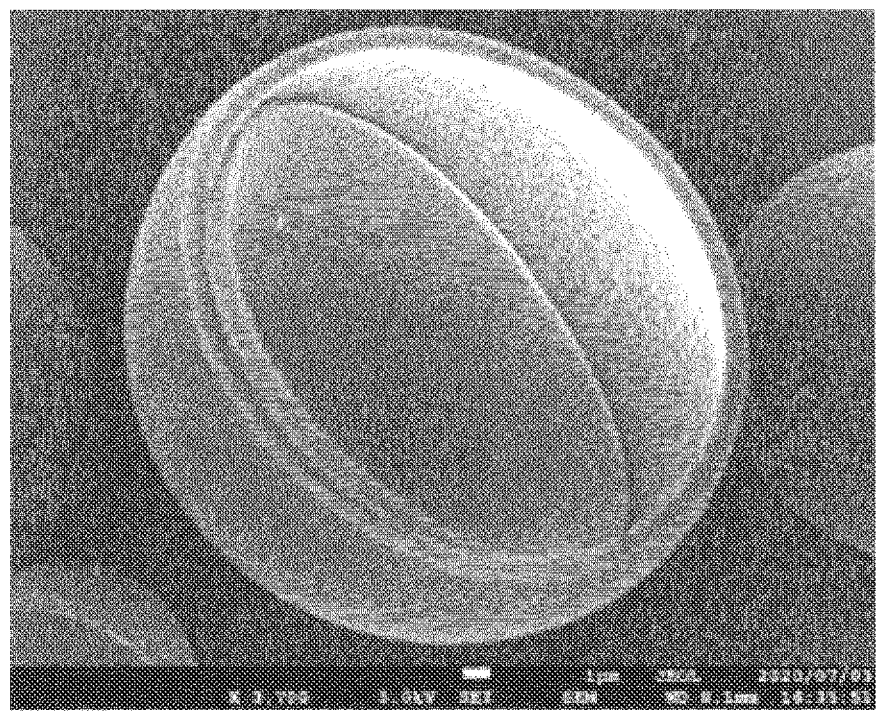
FIG. 3 is a SEM image of the observed internal state of hollow particles obtained in Example 2.

In Examples 1 to 8, hollow particles having a hollow portion, a void ratio of from 78% to 79%, and a volume average particle diameter of from 21 μm to 49.1 μm were obtained. Since the HSP distance between the crosslinkable monomer and hydrophobic solvent used was 5.80 or more and 6.50 or less, the value of "actually measured shell thickness/theoretical shell thickness" was from 0.80 to 1.00; the shell thickness non-uniformity of the hollow particles was small; and the fine resin particles were not present in the interior of the hollow portion. FIG. 3 shows a SEM image of the observed internal state of the hollow particles obtained in Example 2. As is clear from the SEM image of FIG. 3, the obtained hollow particles had a hollow portion that is clearly distinguished from the shell; the shell thickness non-uniformity of the hollow particles was small; and the fine resin particles were not present in the interior of the hollow particles. The SEM images of the observed internal state of the hollow particles obtained in Example 1, 3 to 8 are not shown here; however, they were similar to the SEM image of FIG. 3.

REFERENCE SIGNS LIST

1. Aqueous medium
2. Low polarity material
3. Dispersion stabilizer
4. Monomer composition
4a. Hydrophobic solvent
4b. Material not containing hydrophobic solvent
4c. Polymerizable monomer dispersed in aqueous medium
5. Oil-soluble polymerization initiator
6. Shell
8. Hollow portion
10. Droplet
20. Precursor particle
100. Hollow particle having a hollow portion filled with gas

The invention claimed is:

1. A method for producing hollow particles which comprise a shell containing a resin and a hollow portion surrounded by the shell and which have a void ratio of 50% or more,
the method comprising:
preparing a mixture liquid containing a polymerizable monomer, a hydrophobic solvent, a polymerization initiator, a dispersion stabilizer and an aqueous medium,
suspending the mixture liquid to prepare a suspension in which droplets of a monomer composition containing the polymerizable monomer, the hydrophobic solvent and the polymerization initiator are dispersed in the aqueous medium, and
subjecting the suspension to a polymerization reaction to prepare a precursor composition containing precursor particles which have a hollow portion surrounded by a shell containing a resin and which include the hydrophobic solvent in the hollow portion,
wherein the polymerizable monomer contains a crosslinkable monomer, and
wherein an HSP distance between the crosslinkable monomer and the hydrophobic solvent is 5.80 or more and 6.50 or less.

2. The method for producing the hollow particles according to claim 1, wherein the hydrophobic solvent contains two or more of hydrophobic solvents.

3. The method for producing the hollow particles according to claim 1, wherein the crosslinkable monomer contains a bifunctional crosslinkable monomer having two polymerizable functional groups, and
wherein a content of the bifunctional crosslinkable monomer in 100 parts by mass of the polymerizable monomer, is 70 parts by mass or more and 100 parts by mass or less.

4. The method for producing the hollow particles according to claim 1, wherein the crosslinkable monomer contains a bifunctional crosslinkable monomer having two polymerizable functional groups and a trifunctional or higher-functional crosslinkable monomer having three or more polymerizable functional groups.

5. The method for producing the hollow particles according to claim 1, wherein the mixture liquid contains at least one selected from the group consisting of rosin acids, higher fatty acids and metal salts thereof.

6. The method for producing the hollow particles according to claim 1, wherein the dispersion stabilizer is an inorganic dispersion stabilizer.

7. The method for producing the hollow particles according to claim 6, wherein the inorganic dispersion stabilizer is a sparingly water-soluble metal salt.

8. The method for producing the hollow particles according to claim 1, wherein a volume average particle diameter of the hollow particles is 10 μm or more and 50 μm or less.

9. Hollow particles which comprise a shell containing a resin and a hollow portion surrounded by the shell and which have a void ratio of 50% or more,
wherein a volume average particle diameter is 10 μm or more and 50 μm or less;
wherein a ratio of an actually measured shell thickness to a theoretical shell thickness (actually measured shell thickness/theoretical shell thickness) is 0.80 or more and 1.00 or less; and
wherein the theoretical shell thickness is a value obtained by calculating an inner diameter r of the hollow particles by the following formula (1) using the volume average particle diameter R and void ratio of the hollow particles, and calculating the theoretical shell thickness by the following formula (2) using the inner diameter r and the volume average particle diameter R:

$$4/3\pi \times (R/2)^3 \times (\text{Void ratio}/100) = 4/3\pi \times (r/2)^3 \quad \text{Formula(1)}$$

$$\text{Theoretical shell thickness} = (R-r)/2 \quad \text{Formula(2)}.$$

* * * * *